(12) United States Patent
Vu

(10) Patent No.: US 10,619,745 B2
(45) Date of Patent: *Apr. 14, 2020

(54) CONTROL PLATE FOR A HIGH CONDUCTANCE VALVE

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,896

(22) Filed: Jun. 12, 2019

(65) Prior Publication Data

US 2019/0293185 A1 Sep. 26, 2019

Related U.S. Application Data

(62) Division of application No. 15/997,172, filed on Jun. 4, 2018, now Pat. No. 10,323,754.

(60) Provisional application No. 62/515,063, filed on Jun. 5, 2017.

(51) Int. Cl.
| | | |
|---|---|---|
| F16K 1/36 | (2006.01) | |
| F16K 27/02 | (2006.01) | |
| F16K 41/12 | (2006.01) | |
| F16K 1/42 | (2006.01) | |

(52) U.S. Cl.
CPC .............. *F16K 1/36* (2013.01); *F16K 1/42* (2013.01); *F16K 27/02* (2013.01); *F16K 41/12* (2013.01)

(58) Field of Classification Search
None
See application file for complete search history.

(56) References Cited

U.S. PATENT DOCUMENTS

| 2,595,012 | A | ‡ | 4/1952 | Smith | ........................ | F16K 1/36 |
|---|---|---|---|---|---|---|
| | | | | | | 137/63 |
| 2,638,109 | A | ‡ | 5/1953 | Wahlmark | .............. | F16K 17/10 |
| | | | | | | 137/11 |
| 2,642,260 | A | ‡ | 6/1953 | Moore | ....................... | F16K 1/42 |
| | | | | | | 137/53 |

(Continued)

FOREIGN PATENT DOCUMENTS

| CH | 251490 A | ‡ | 10/1947 | ............... F16K 1/42 |
|---|---|---|---|---|
| CH | 251490 A | | 10/1947 | |

(Continued)

OTHER PUBLICATIONS

International Search Report and the Written Opinion of the International Searching Authority from corresponding PCT/US2018/035881 dated Sep. 7, 2018.‡

(Continued)

*Primary Examiner* — John Fox
(74) *Attorney, Agent, or Firm* — Lando & Anastasi, LLP

(57) ABSTRACT

A high purity fluid control valve includes a moveable control plate having a flow-through passage to enhance fluid sweep of the internal valve volume. The valve is of jet and seat type using nested orifice ridges to achieve high conductance with small actuator movement. The flow-through control plate is especially useful in fast acting proportional control applications such as gas delivery in semiconductor manufacturing.

20 Claims, 11 Drawing Sheets

SECTION XI-XI

(56) References Cited

U.S. PATENT DOCUMENTS

| | | | | |
|---|---|---|---|---|
| 3,206,530 A ‡ | 9/1965 | Boteler | F16K 27/0236 | 137/37 |
| 3,219,063 A ‡ | 11/1965 | Schumann | F16K 1/34 | 137/625.33 |
| 3,257,097 A ‡ | 6/1966 | Boteler | F16K 7/123 | 251/33 |
| 3,275,292 A ‡ | 9/1966 | Boteler | F16K 27/0236 | 251/33 |
| 3,278,156 A ‡ | 10/1966 | Callahan, Jr. | F16K 41/10 | 251/33 |
| 3,295,191 A ‡ | 1/1967 | Gallagher | F16K 41/10 | 251/33 |
| 3,300,844 A ‡ | 1/1967 | Boteler | B21C 37/29 | 251/33 |
| 3,374,522 A ‡ | 3/1968 | Boteler | F16K 27/0236 | 251/33 |
| 3,407,838 A ‡ | 10/1968 | Boteler | F16K 27/0236 | 137/37 |
| 3,438,391 A ‡ | 4/1969 | Yocum | F16K 1/36 | 137/51 |
| 3,613,518 A ‡ | 10/1971 | Prosser | F15B 15/10 | 92/98 R |
| 3,853,268 A ‡ | 12/1974 | Schneider | G05D 23/10 | 137/625.33 |
| 4,074,701 A ‡ | 2/1978 | Kemmler | F15B 13/0405 | 137/62 |
| 4,124,676 A ‡ | 11/1978 | Henzl | B29C 33/50 | 249/12 |
| 4,300,595 A ‡ | 11/1981 | Mayer | F16K 1/34 | 137/625.33 |
| 4,301,992 A ‡ | 11/1981 | Karbo | F16K 31/402 | 251/30 |
| 4,343,754 A ‡ | 8/1982 | Wilde | B29C 37/0082 | 264/15 |
| 4,390,130 A ‡ | 6/1983 | Linssen | F02M 51/065 | 239/58 |
| 4,509,715 A ‡ | 4/1985 | Kubach | F02M 69/26 | 123/45 |
| 4,569,504 A ‡ | 2/1986 | Doyle | H01F 7/1638 | 251/12 |
| 4,606,374 A ‡ | 8/1986 | Kolenc | F16K 37/00 | 137/55 |
| 4,648,368 A ‡ | 3/1987 | Gmelin | F02M 69/26 | 123/45 |
| 4,671,490 A ‡ | 6/1987 | Kolenc | F16K 41/12 | 251/26 |
| 4,695,034 A ‡ | 9/1987 | Shimizu | F16K 31/007 | 137/48 |
| 4,705,059 A ‡ | 11/1987 | Lecerf | F15B 13/0438 | 137/62 |
| 4,732,363 A ‡ | 3/1988 | Kolenc | F16K 41/12 | 251/33 |
| 4,778,640 A ‡ | 10/1988 | Braun | B26B 21/443 | 264/25 |
| 4,856,555 A ‡ | 8/1989 | Gausman | F16K 15/02 | 137/54 |
| 4,904,430 A ‡ | 2/1990 | Yamada | B29C 31/008 | 264/10 |
| 4,964,423 A ‡ | 10/1990 | Gausman | F16K 15/02 | 137/54 |
| 4,977,916 A ‡ | 12/1990 | Ohmi | G01F 1/68 | 137/48 |
| 5,040,567 A ‡ | 8/1991 | Nestler | F16K 11/04 | 137/62 |
| 5,145,147 A ‡ | 9/1992 | Nakazawa | F16K 31/007 | 251/11 |
| 5,201,492 A ‡ | 4/1993 | Beauvir | F16K 7/16 | 251/33 |
| 5,279,328 A ‡ | 1/1994 | Linder | F16K 7/16 | 137/59 |
| 5,533,543 A ‡ | 7/1996 | Semeia | B29C 37/0085 | 137/15 |
| 5,660,207 A ‡ | 8/1997 | Mudd | B23P 11/005 | 137/44 |
| 5,730,423 A ‡ | 3/1998 | Wu | F16K 7/14 | 251/33 |
| 5,743,513 A ‡ | 4/1998 | Yoshikawa | F16K 41/12 | 251/33 |
| 5,755,428 A ‡ | 5/1998 | Ollivier | F16K 7/14 | 251/33 |
| 5,799,696 A ‡ | 9/1998 | Weiss | F16K 11/052 | 137/62 |
| 5,820,105 A ‡ | 10/1998 | Yamaji | C22C 19/055 | 251/36 |
| 5,851,004 A ‡ | 12/1998 | Wu | F16K 7/14 | 251/33 |
| 5,899,564 A ‡ | 5/1999 | Kinney | B01F 5/0679 | 138/43 |
| 5,927,325 A ‡ | 7/1999 | Bensaoula | F16K 99/0001 | 137/37 |
| 5,992,463 A ‡ | 11/1999 | Redemann | C23C 16/44 | 137/24 |
| 6,123,320 A ‡ | 9/2000 | Rasanow | F16K 31/122 | 251/33 |
| 6,161,783 A ‡ | 12/2000 | Press | F02M 51/0639 | 239/58 |
| 6,178,996 B1‡ | 1/2001 | Suzuki | G05D 7/0635 | 137/33 |
| 6,394,136 B1‡ | 5/2002 | Rohrbeck | F16K 11/052 | 137/62 |
| 6,406,605 B1‡ | 6/2002 | Moles | F15C 5/00 | 137/83 |
| 6,705,755 B1‡ | 3/2004 | Innings | B01F 5/0663 | 137/625.33 |
| 6,962,164 B2‡ | 11/2005 | Lull | G01F 25/0007 | 137/2 |
| 7,401,762 B2‡ | 7/2008 | Ohmori | F16K 1/36 | 137/34 |
| 7,513,483 B1‡ | 4/2009 | Blume | F16K 1/34 | 137/51 |
| 7,591,281 B2‡ | 9/2009 | Tsuge | F16K 31/0655 | 137/49 |
| 8,070,132 B2‡ | 12/2011 | Hall | F16K 1/06 | 251/31 |
| 8,420,197 B2‡ | 4/2013 | Giraud | B29C 37/0082 | 428/13 |
| 8,511,337 B2‡ | 8/2013 | Nishimura | F16K 1/42 | 137/48 |
| 9,022,347 B2‡ | 5/2015 | Tatarek | B29C 45/14311 | 251/33 |
| 9,115,820 B2‡ | 8/2015 | Scheibe | F16K 37/0033 | |
| 9,291,279 B2‡ | 3/2016 | Wopper | F16K 27/0236 | |
| 9,371,930 B2‡ | 6/2016 | Hayashi | F16K 47/00 | |
| 10,006,556 B2‡ | 6/2018 | Vu | F16K 1/16 | |
| 2003/0178427 A1‡ | 9/2003 | Chomik | A61J 9/04 | 220/30 |
| 2003/0183789 A1‡ | 10/2003 | Kerg | F16K 41/103 | 251/63 |
| 2005/0012060 A1‡ | 1/2005 | Dzialakiewicz | F16K 31/0682 | 251/12 |
| 2005/0067603 A1 | 3/2005 | Lucas et al. | | |
| 2005/0224744 A1‡ | 10/2005 | Newberg | F16K 1/36 | 251/33 |
| 2005/0229969 A1‡ | 10/2005 | Nguyen | F16K 31/0655 | 137/24 |
| 2006/0169941 A1‡ | 8/2006 | Glime | F16K 1/34 | 251/33 |
| 2006/0174945 A1‡ | 8/2006 | Maula | F16K 7/14 | 137/34 |
| 2006/0191777 A1‡ | 8/2006 | Glime | F16K 1/523 | 200/81 |
| 2007/0200082 A1‡ | 8/2007 | Crockett | C22C 19/055 | 251/34 |
| 2008/0073605 A1‡ | 3/2008 | Ishigaki | F16K 1/36 | 251/12 |
| 2009/0141584 A1‡ | 6/2009 | Boer | B01F 3/0807 | 366/33 |

(56) References Cited

U.S. PATENT DOCUMENTS

| | | | |
|---|---|---|---|
| 2010/0096578 A1 ‡ | 4/2010 | Franz | F16K 41/12 251/31 |
| 2010/0108920 A1 | 5/2010 | Tatarek | |
| 2010/0326533 A1 | 12/2010 | Mooney et al. | |
| 2012/0080134 A1 | 4/2012 | Harris et al. | |
| 2013/0009086 A1 ‡ | 1/2013 | Walker | F16K 31/402 251/33 |
| 2013/0032600 A1 ‡ | 2/2013 | Umezaki | F16K 1/302 220/58 |
| 2014/0084202 A1 ‡ | 3/2014 | Mevius | F16J 15/104 251/35 |
| 2014/0264104 A1 ‡ | 9/2014 | Ringer | F16K 7/126 251/61 |
| 2015/0059877 A1 ‡ | 3/2015 | Vu | F16K 27/029 137/48 |
| 2015/0129791 A1 ‡ | 5/2015 | Okita | F16K 7/14 251/33 |
| 2015/0267838 A1 ‡ | 9/2015 | Gassman | F16K 31/42 251/30 |
| 2015/0362080 A1 ‡ | 12/2015 | Vu | F16K 1/42 137/1 |
| 2016/0138730 A1 ‡ | 5/2016 | Vu | F16K 1/16 251/22 |
| 2016/0279376 A1 ‡ | 9/2016 | Cewers | F16K 41/10 |
| 2016/0369915 A1 ‡ | 12/2016 | Vu | F16K 41/12 |
| 2017/0009890 A1 ‡ | 1/2017 | Vu | F16K 1/36 |
| 2017/0037974 A1 | 2/2017 | Sauer | |
| 2018/0347707 A1 | 12/2018 | Vu | |

FOREIGN PATENT DOCUMENTS

| | | | | |
|---|---|---|---|---|
| CN | 102812276 A | ‡ | 12/2012 | F16K 99/0001 |
| CN | 102812276 A | | 12/2012 | |
| DE | 1070190 B | | 12/1959 | |
| DE | 1070190 B | ‡ | 12/1959 | F16K 47/04 |
| DE | 4134430 C1 | | 2/1993 | |
| DE | 4134430 C1 | ‡ | 2/1993 | B29C 37/005 |
| EP | 1610044 A2 | | 12/2005 | |
| EP | 1610044 A2 | ‡ | 12/2005 | F16K 7/16 |
| EP | 1676067 A2 | ‡ | 7/2006 | F16K 7/14 |
| EP | 1676067 A2 | | 7/2006 | |
| EP | 2711594 A1 | ‡ | 3/2014 | F16K 1/42 |
| EP | 2711594 A1 | | 3/2014 | |
| GB | 1073998 A | ‡ | 6/1967 | F16K 1/34 |
| GB | 1073998 A | | 6/1967 | |
| GB | 2517451 A | ‡ | 2/2015 | F16K 1/36 |
| GB | 2517451 A | | 2/2015 | |
| JP | H11270699 A | ‡ | 10/1999 | |
| JP | H11270699 A | | 10/1999 | |
| JP | 2012127487 A | | 7/2012 | |
| JP | 2012127487 A | ‡ | 7/2012 | F16K 7/14 |
| WO | 2014188785 A1 | | 11/2014 | |
| WO | WO-2014188785 A1 | ‡ | 11/2014 | F16K 1/42 |
| WO | 2015191960 A1 | | 12/2015 | |

OTHER PUBLICATIONS

International Search Report and Written Opinion from International Application No. PCT/US2018/060829 dated Aug. 1, 2019.

‡ imported from a related application

SECTION I-I

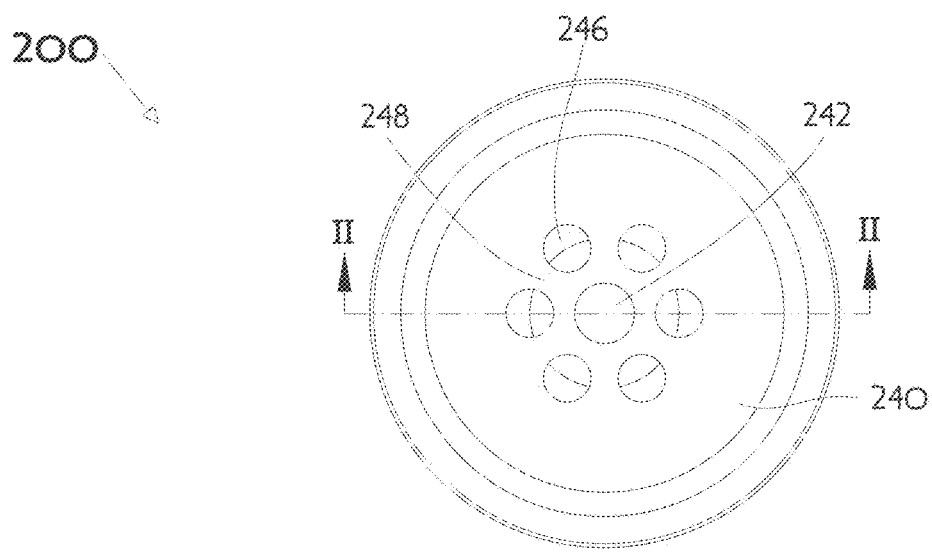
FIG. 2A
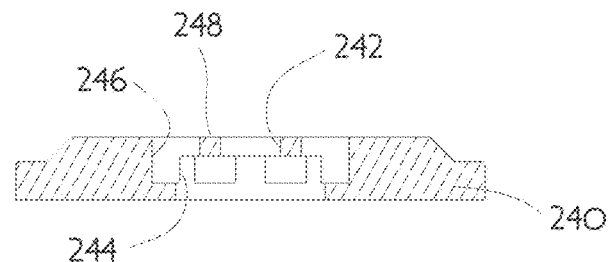
SECTION II-II
FIG. 2B
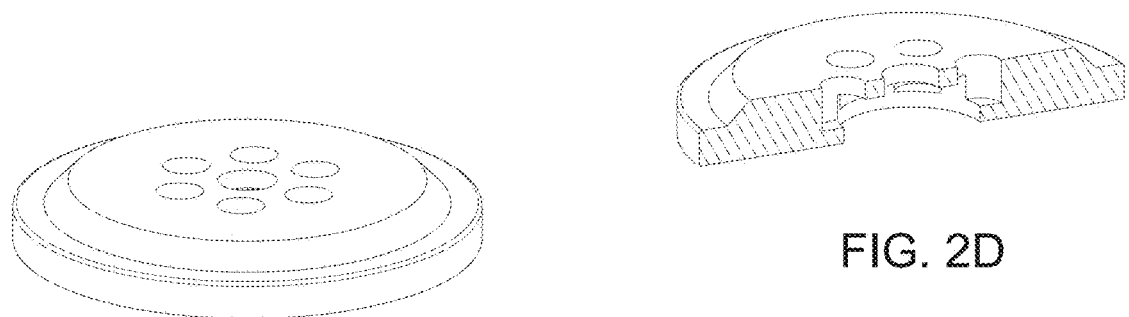
FIG. 2C
FIG. 2D

SECTION III-III

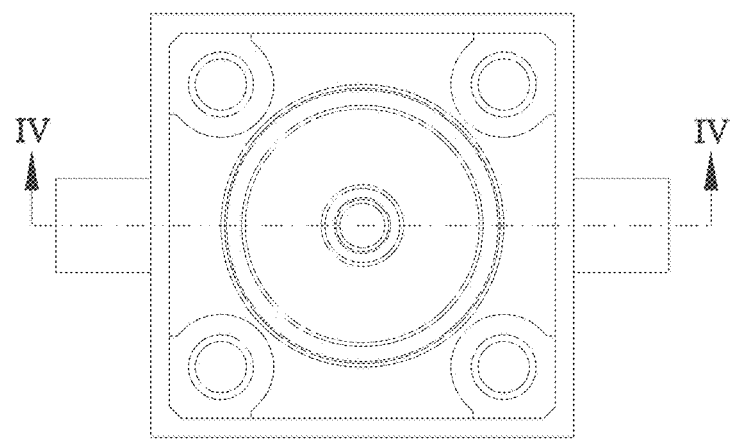
FIG. 4A
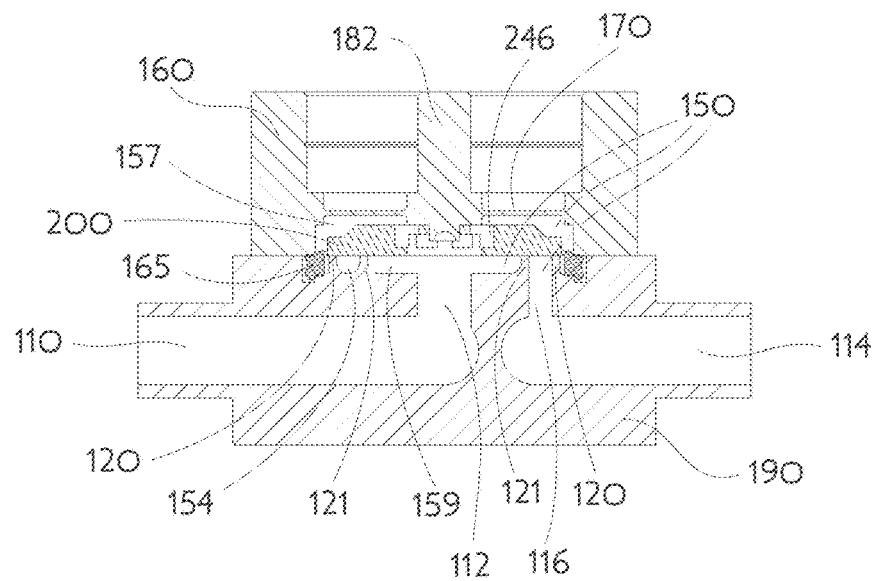
SECTION IV-IV
FIG. 4B
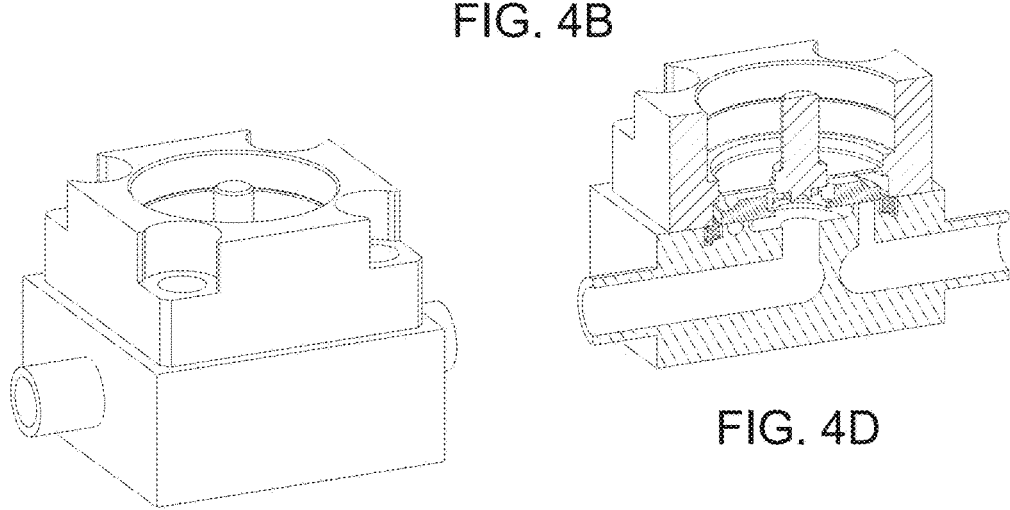
FIG. 4C
FIG. 4D

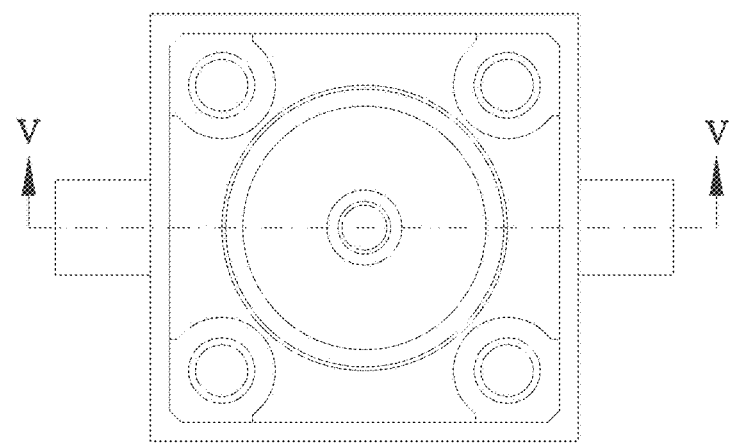
FIG. 5A
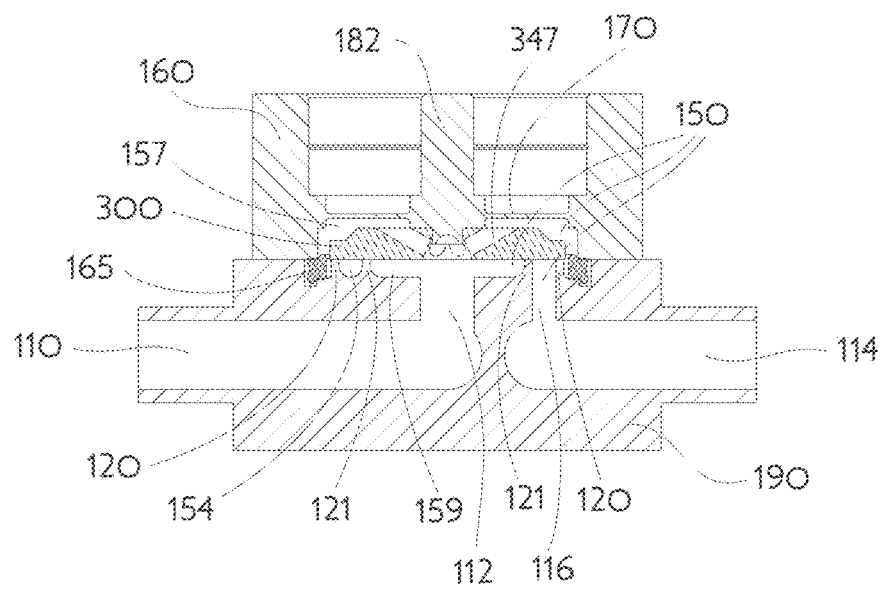
SECTION V-V
FIG. 5B
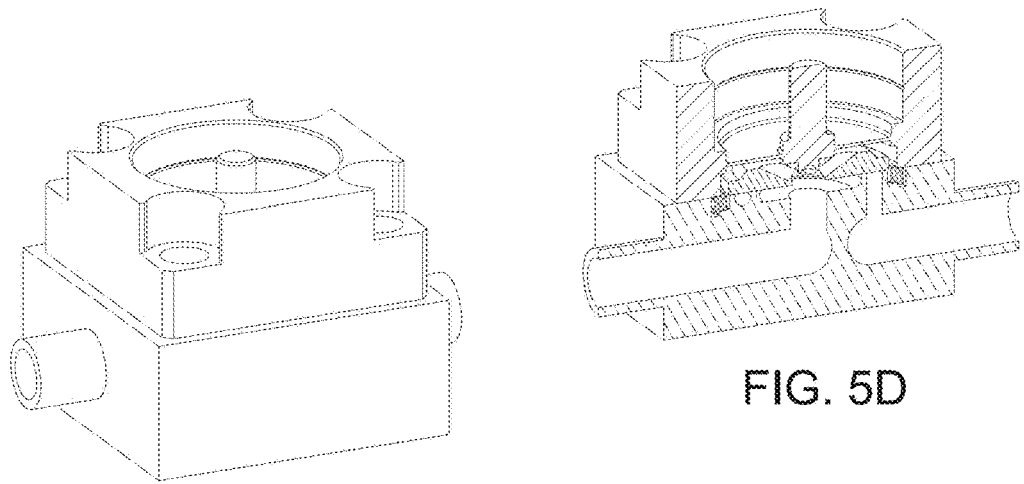
FIG. 5C
FIG. 5D

SECTION VI-VI

SECTION VII-VII

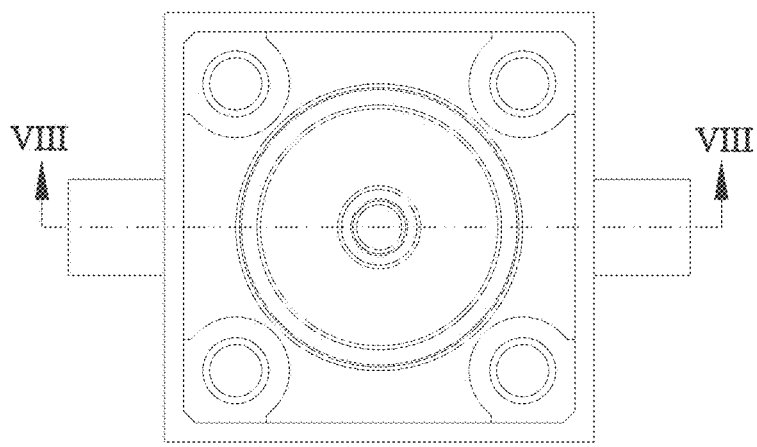
FIG. 8A
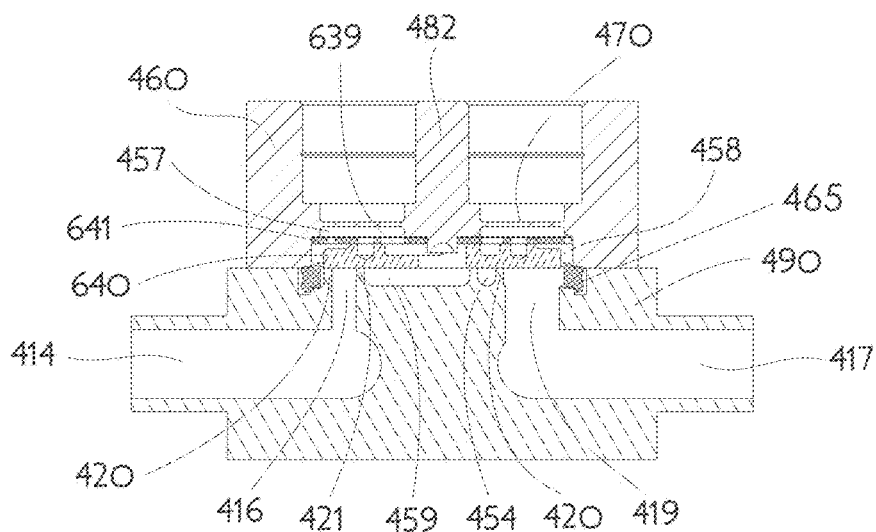
SECTION VIII-VIII
FIG. 8B
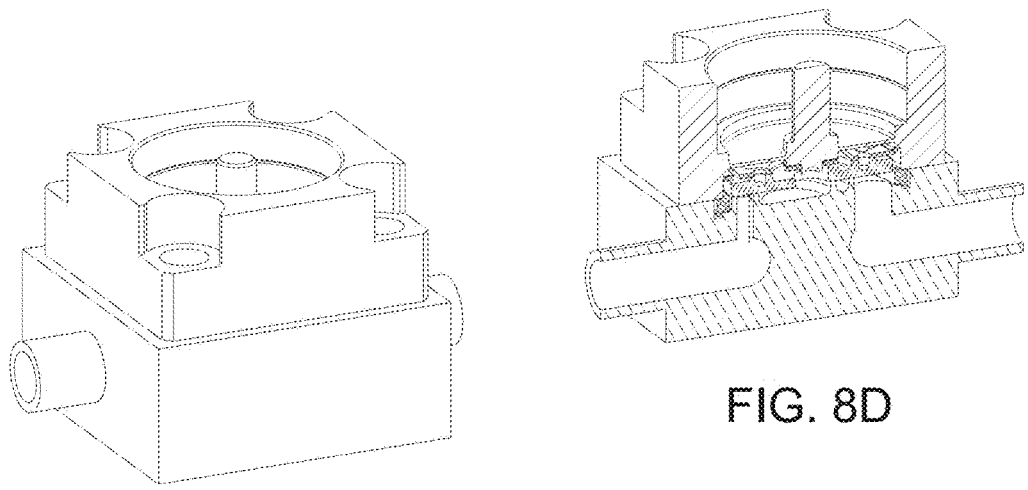
FIG. 8C
FIG. 8D

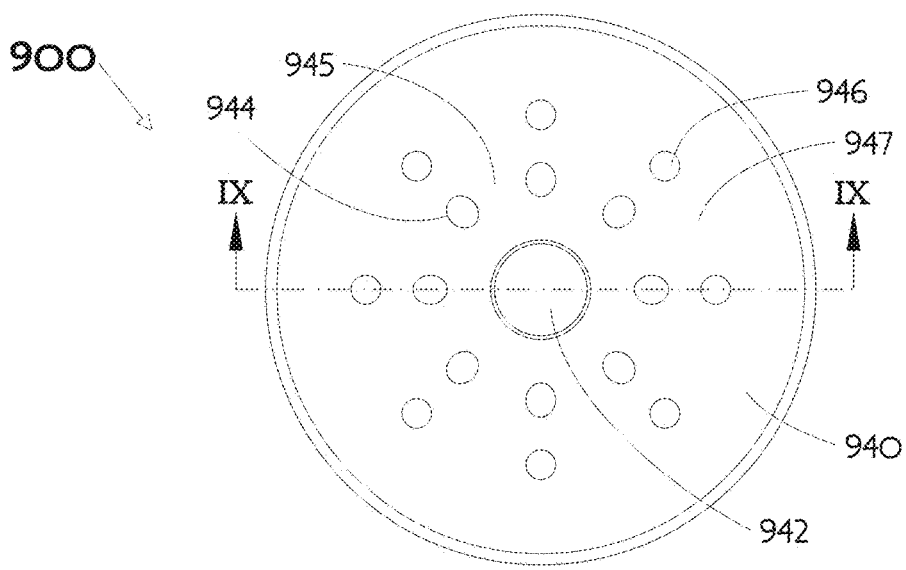
FIG. 9A
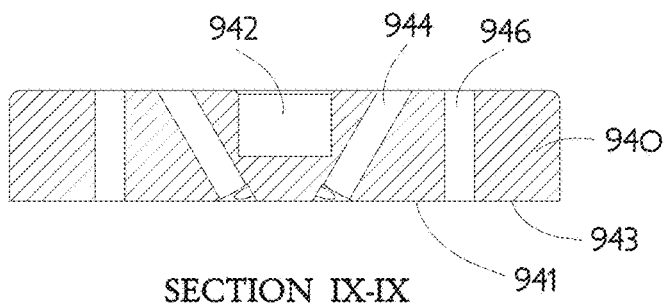
SECTION IX-IX
FIG. 9B
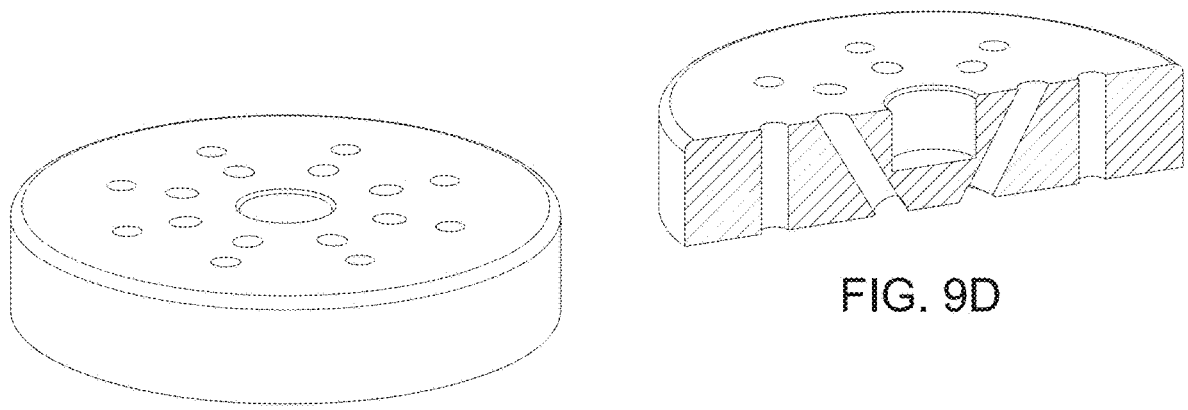
FIG. 9C
FIG. 9D

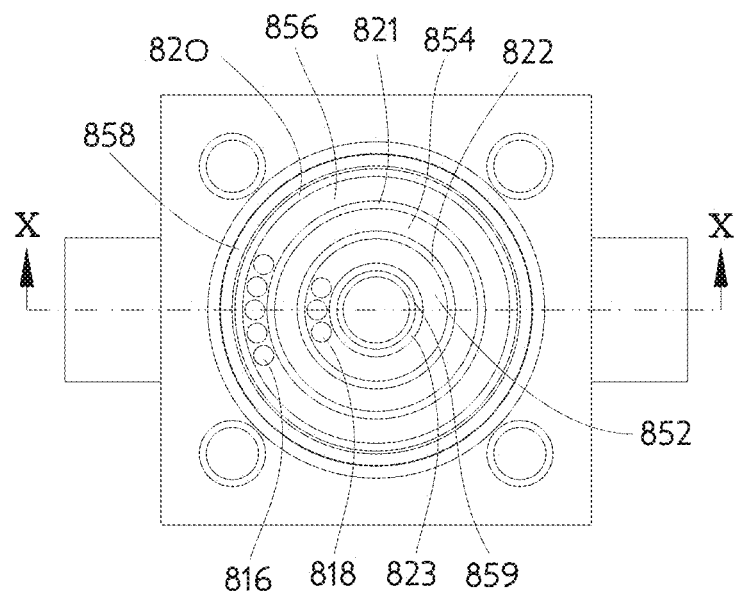
FIG. 10A
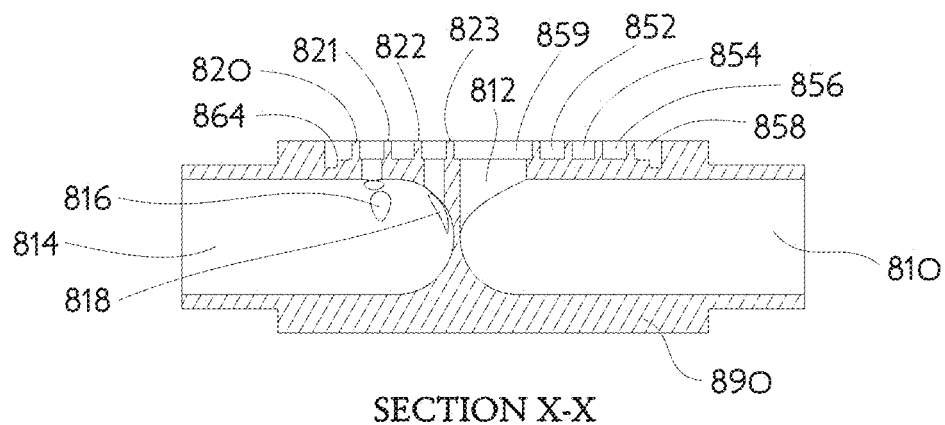
SECTION X-X
FIG. 10B
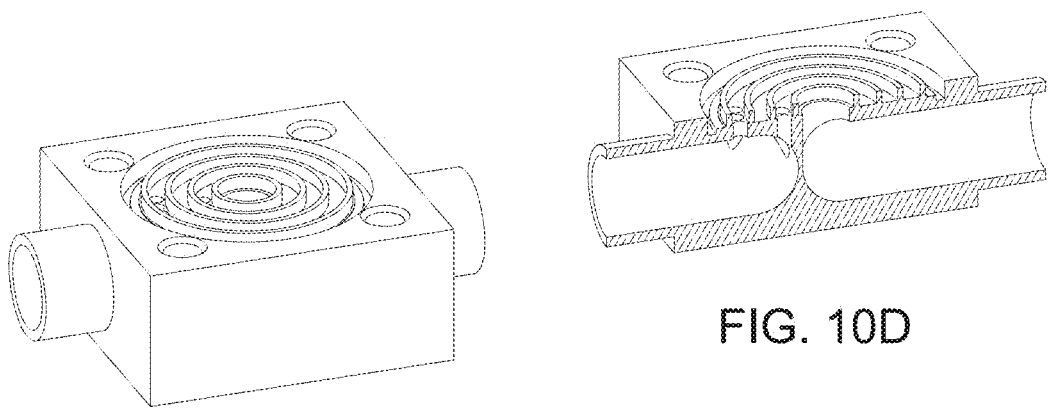
FIG. 10C
FIG. 10D

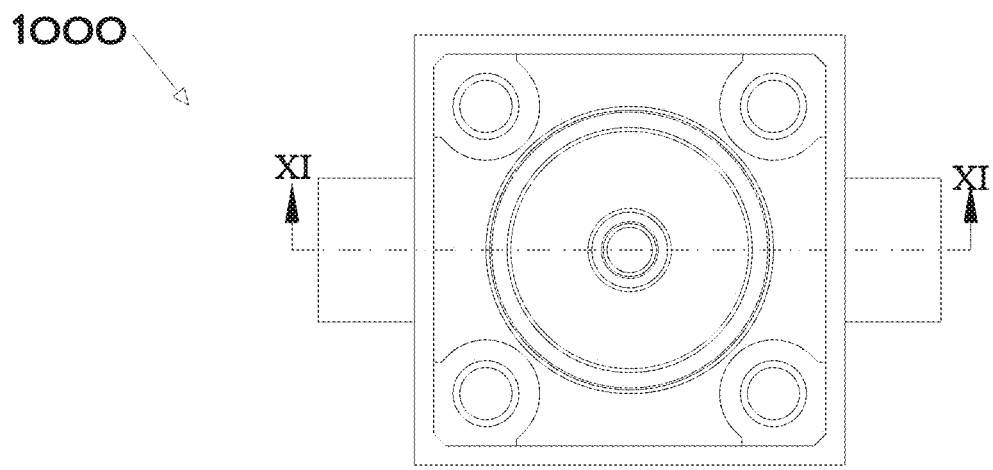
FIG. 11A
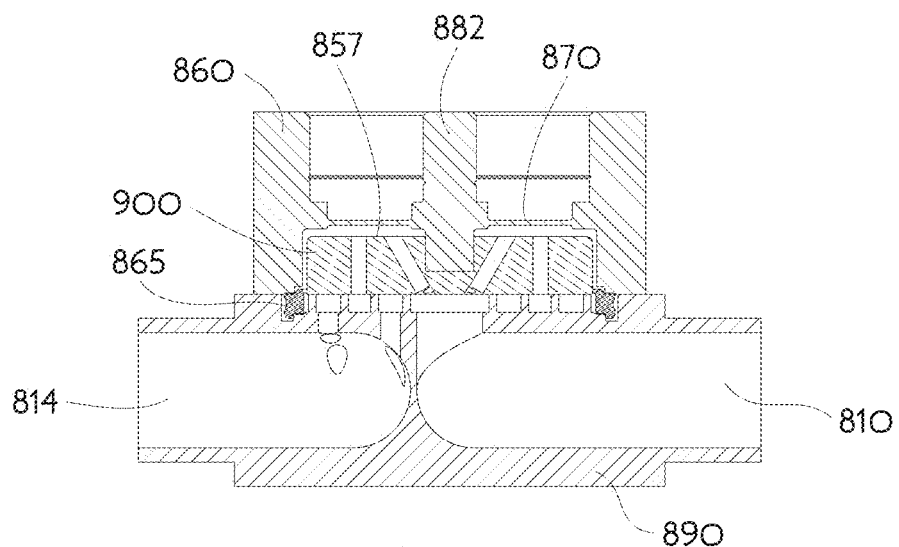
SECTION XI-XI
FIG. 11B
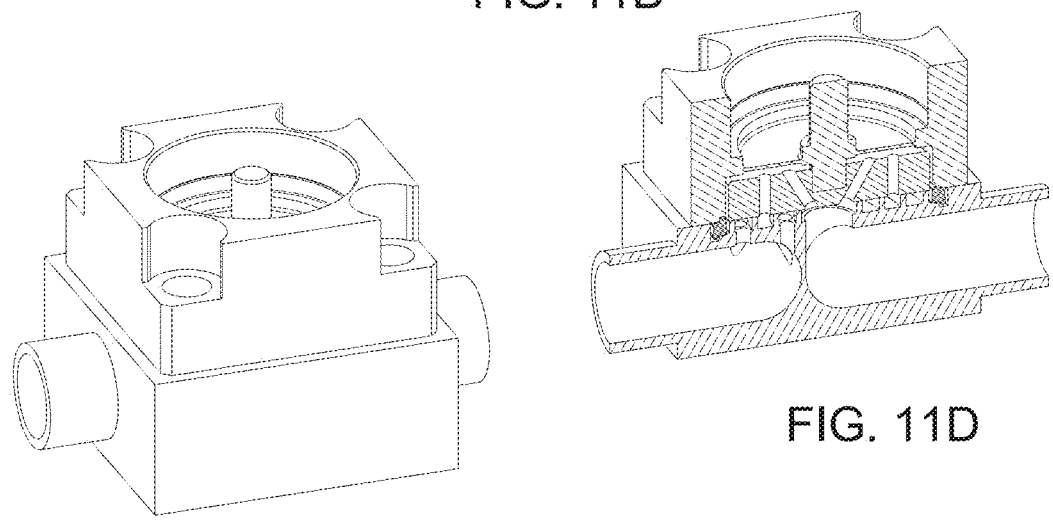
FIG. 11C
FIG. 11D

CONTROL PLATE FOR A HIGH CONDUCTANCE VALVE

CROSS-REFERENCE TO RELATED APPLICATIONS

This application is a divisional of pending U.S. patent application Ser. No. 15/997,172 titled "CONTROL PLATE FOR A HIGH CONDUCTANCE VALVE," filed 4 Jun. 2018, which claims the benefit under 35 U.S.C. § 119(e) to U.S. Provisional Application Ser. No. 62/515,063 titled "CONTROL PLATE WITH FLOW-THROUGH PASSAGE FOR A VALVE," filed 5 Jun. 2017, each of which is incorporated by reference herein in its entirety for all purposes. This application is related to U.S. patent application Ser. No. 15/204,245 titled "CONTROL PLATE IN A VALVE," filed 7 Jul. 2016, U.S. patent application Ser. No. 15/182,978 titled "LOW HYSTERESIS DIAPHRAGM FOR A VALVE," filed 15 Jun. 2016, U.S. patent application Ser. No. 14/932,086 titled "VALVE STROKE AMPLIFIER MECHANISM ASSEMBLY," filed 4 Nov. 2015, and U.S. patent application Ser. No. 14/737,564 titled "HIGH CONDUCTANCE VALVE FOR FLUIDS AND VAPORS," filed 12 Jun. 2015, each of which is incorporated by reference herein in its entirety for all purposes.

BACKGROUND

The present invention is related to a moveable portion of a fluid control valve that may be actively positioned, anywhere between an extreme open condition and an extreme closed condition, to adjust a flow of fluid passing through the valve. The movable portion includes provision for a portion of the flowing fluid to pass through a control plate thereby improving cleanliness by reducing potential fluid stagnation. The invention is particularly useful in valves intended for high purity proportional control or modulating control of fluid delivery within industrial processes making semiconductor devices, pharmaceuticals, or fine chemicals, and many similar fluid delivery systems that simultaneously demand a leak-tight shut-off in the fully closed condition along with proportional control.

SUMMARY

In consideration of the foregoing, applicant has invented a high purity fluid control valve that includes a moveable control plate having at least one flow-through passage to enhance fluid sweep of the internal valve volume. The valve is of jet and seat type wherein a relatively narrow planar land is formed at the opening of a fluid passageway and a flat seat may be moved into contact with the land to close off fluid flow. In this disclosure the jet element is usually described as an orifice ridge and the seat element is usually described as a control plate. The valve uses nested orifice ridges to achieve high conductance with small actuator movement by providing large control gap length with small enclosed area. The control plate has a continuous uninterrupted flat portion sized to bridge adjacent orifice ridge segments to shut-off fluid flow in the fully closed condition. The orifice ridge segments are coplanar and may be lapped to provide a smooth surface for the control plate to seat against. The flow-through control plate is especially useful in fast acting proportional control applications such as gas delivery in semiconductor manufacturing.

According to an embodiment a control plate comprises a control plate body formed as a basically circular disk having a flat side, wherein the control plate body is pierced through by at least one fluid passageway, and the at least one fluid passageway extends from the flat side to an opposed side.

According to another embodiment a valve assembly comprises a valve body including nested orifice ridges defining an intermediate valve chamber portion between the orifice ridges which is fluidly connected to a fluid passageway, and a control plate including at least one fluid passageway through the control plate, wherein the at least one fluid passageway through the control plate enables controlled flow of a fluid between an inner valve chamber portion located inside both nested orifice ridges and an outer valve chamber portion located outside both nested orifice ridges, so that some of the controlled fluid flow sweeps through possibly stagnant volumes within the complete valve assembly.

According to an aspect of the present invention, a control plate for a high-conductance valve is provided. The control plate comprises a control plate body formed as a basically circular disk having a flat side and an opposed side opposite the flat side, the control plate configured to be moved within a valve by an actuator, the flat side having a continuous uninterrupted flat portion to shut-off fluid flow in the valve; and at least one fluid passageway defined in the control plate body, the at least one fluid passageway extending from the flat side through to the opposed side. In accordance with various examples, the at least one fluid passageway includes a plurality of fluid passageways defined in the control plate body and extending from the flat side through to the opposed side.

In accordance with one example, the plurality of fluid passageways are disposed about a center of the control plate body and the continuous uninterrupted flat portion of the flat side surrounds each of the plurality of fluid passageways. In accordance with another example, the control plate further comprises a recess formed in the flat side of the control plate body in a center of the control plate body, the plurality of fluid passageways extend outwardly from the recess through to the opposed side at an angle, and the continuous uninterrupted flat portion of the flat side surrounds each of the plurality of fluid passageways.

In accordance with yet another example, the plurality of fluid passageways includes a first plurality of angled fluid passageways disposed about a center of the control plate body and a second plurality of straight fluid passageways disposed about a radially outer portion of the control plate body and extending substantially straight through the control plate body, the first plurality of angled fluid passageways angling radially inwardly from the opposed side to the flat side. In accordance with an aspect of this example, the flat side includes a first continuous uninterrupted flat portion disposed between the plurality of angled fluid passageways and the plurality of straight fluid passageways and a second continuous uninterrupted flat portion disposed radially outward of the plurality of straight fluid passageways. In accordance with an aspect of each of the above-described examples, the control plate further comprises one of a central thru-hole extending through the center of the control plate body and a blind hole formed in the opposed side in the center of the control plate body, the one of the central thru-hole and the blind hole being constructed to mount the control plate body onto a control shaft.

In accordance with another example, the control plate may further comprise an amplifier disc coupled to the control plate body. The amplifier disc has an inner segment and an outer periphery, the inner segment coupled to and spaced apart from the outer periphery by connecting arms such that axial displacement of the inner segment causes asymmetric displacement of an opposing portion of the outer periphery of the amplifier disc. In accordance with this example, the control plate further includes a ring-shaped groove defined in the control plate body, the ring-shaped groove having a relief surface opposite the flat side, wherein the at least one fluid passageway includes a thru-hole defined in the control plate body and intersecting the ring-shaped groove.

In accordance with another aspect of the present invention, a valve assembly is provided. The valve assembly comprises a valve body and a control plate. The valve body has a valve chamber, at least one first fluid conduit aperture in fluid communication with the valve chamber, at least one second fluid conduit aperture in fluid communication with the valve chamber, and at least one pair of adjacent orifice ridge segments, the at least one pair of adjacent orifice ridge segments extending from the valve body into the valve chamber and defining an intermediate valve chamber region between the at least one pair of adjacent orifice ridge segments. The control plate includes a control plate body having a first side and a second side opposed to the first side, the control plate body being movable between a closed position in which a surface region of the first side sealingly contacts the at least one pair of adjacent orifice ridge segments and an open position in which an open gap is present between the surface region and the at least one pair of adjacent orifice ridge segments. The control plate has at least one fluid passageway extending through the control plate body from the first side to the second side within a perimeter of the at least one pair of adjacent orifice ridge segments. In accordance with various examples, the at least one pair of adjacent orifice ridges may be concentric with one another and substantially centered in the valve chamber, or they may be positioned off-center within the valve chamber and nested.

In accordance with one example, the at least one pair of adjacent orifice ridge segments includes two adjacent orifice ridge segments that are substantially circular in shape and further define an outer valve chamber portion disposed outside the two adjacent orifice ridge segments and an inner valve chamber portion disposed inside the two adjacent orifice ridge segments. In accordance with an aspect of this example, the valve assembly may further comprise a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the inner valve chamber portion, the at least one second fluid conduit aperture is in fluid communication with the intermediate valve chamber portion, and the surface region of the first side of the control plate body sealingly contacts the two adjacent orifice ridge segments to prevent fluid flow from flowing between the at least one first fluid conduit aperture and the at least one second fluid conduit aperture. In accordance with yet a further aspect of this example, when the control plate body is in the closed position, the at least one fluid passageway of the control plate provides fluid communication between the inner valve chamber portion and the outer valve chamber portion.

In accordance with an alternative aspect of this example, the valve assembly may further comprise a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the outer valve chamber portion, the at least one second fluid conduit aperture is in fluid communication with the intermediate valve chamber portion, and the surface region of the first side of the control plate body sealingly contacts the two adjacent orifice ridge segments to prevent fluid from flowing between the at least one first fluid conduit aperture and the at least one second fluid conduit aperture. In accordance with a further aspect of this example, when the control plate body is in the closed position, the at least one fluid passageway of the control plate provides fluid communication between the outer valve chamber portion and the inner valve chamber portion.

In accordance with an alternative example, the at least one pair of adjacent orifice ridge segments includes four adjacent orifice ridge segments that are substantially circular in shape, the four adjacent orifice ridge segments including a largest orifice ridge segment, a first smaller orifice ridge segment surrounded by the largest orifice ridge segment, a second smaller orifice ridge segment surrounded by the first smaller orifice ridge segment, and a smallest orifice ridge segment surrounded by the second smaller orifice ridge segment, the four adjacent orifice ridge segments defining an outer valve chamber portion disposed outside the four adjacent orifice ridge segments, an inner valve chamber portion disposed inside the four adjacent orifice ridge segments, a first intermediate valve chamber portion disposed between the largest orifice ridge segment and the first smaller orifice ridge segment, a second intermediate valve chamber portion disposed between the first smaller orifice ridge segment and the second smaller orifice ridge segment, and a third intermediate valve chamber portion disposed between the second smaller orifice ridge segment and the smallest orifice ridge segment.

In accordance with an aspect of the alternative example, the valve assembly further comprises a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the inner valve chamber portion, the at least one second fluid conduit aperture is in fluid communication with the first intermediate valve chamber portion and a first continuous uninterrupted flat portion of the surface region of the first side of the control plate body sealingly contacts the largest orifice ridge segment and the first smaller orifice ridge segment to prevent fluid from flowing between the at least one first fluid conduit aperture and the at least one second fluid conduit aperture.

In accordance with a further aspect of this alternative example, the valve body further includes at least one third fluid conduit aperture in fluid communication with the second fluid conduit, and wherein when the control plate body is in the closed position, the at least one third fluid conduit aperture is in fluid communication with the third intermediate valve chamber portion and a second continuous uninterrupted flat portion of the surface region of the first side of the control plate body sealingly contacts the second smaller orifice ridge segment and the smallest orifice ridge segment to prevent fluid from flowing between the at least one first fluid conduit aperture and the at least one third fluid conduit aperture.

In accordance with yet a further aspect of this alternative example, the at least one fluid passageway includes a first plurality of angled fluid passageways disposed about a radially inner portion of the control plate body and a second plurality of straight fluid passageways disposed about a radially outer portion of the control plate body and extending substantially straight through the control plate body, the first plurality of angled fluid passageways angling radially inwardly from the second side of the control plate body to the first side. In accordance with another aspect of this alternative example, the second continuous uninterrupted flat portion of the surface region of the first side of the control plate body is disposed between the plurality of angled fluid passageways and the plurality of straight fluid passageways and the second continuous uninterrupted flat portion of the surface region is disposed radially outward of the plurality of straight fluid passageways. In accordance with this alternative example, when the control plate body is in the closed position, the first plurality of angled fluid passageways in the control plate provide fluid communication between the inner valve chamber portion and the outer valve chamber portion, and the first plurality of angled fluid passageways and the second plurality of straight fluid passageways provide fluid communication between the inner valve chamber portion, the outer valve chamber portion, and the second intermediate valve chamber portion.

BRIEF DESCRIPTION OF DRAWINGS

FIG. 2A illustrates a plan view of an embodiment of a control plate with flow-through passages for a high-conductance valve;

FIG. 2B illustrates a cross-sectional view of the control plate of FIG. 2A taken along line II-II;

FIG. 2C illustrates a top perspective view of the control plate of FIG. 2A;

FIG. 2D illustrates a top perspective cross-sectional view of the control plate of FIG. 2A taken along line II-II;

FIG. 4A illustrates a plan view of an embodiment of a control plate with flow-through passages in accordance with FIGS. 2A-D combined with a valve topworks installed atop a high-conductance valve body having concentric centered orifice ridges in accordance with FIGS. 1A-1D;

FIG. 4B illustrates a cross-sectional view of the embodiment of FIG. 4A taken along line IV-IV;

FIG. 4C illustrates a top perspective view of the embodiment of FIG. 4A;

FIG. 4D illustrates a top perspective cross-sectional view of the embodiment of FIG. 4A taken along line IV-IV;

FIG. 5A illustrates a plan view of an embodiment of a control plate with flow-through passages in accordance with FIGS. 3A-3D combined with a valve topworks installed atop a high-conductance valve body having centered concentric orifice ridges in accordance with FIGS. 1A-1D;

FIG. 5B illustrates a cross-sectional view of the embodiment of FIG. 5A taken along line V-V;

FIG. 5C illustrates a top perspective view of the embodiment of FIG. 5A;

FIG. 5D illustrates a top perspective cross-sectional view of the embodiment of FIG. 5A taken along line V-V;

FIG. 8A illustrates a plan view of a control plate with flow-through passages and amplifier disc in accordance with FIGS. 7A-7F combined with a valve topworks installed atop a high-conductance valve body having offset concentric orifice ridges in accordance with FIGS. 6A-6D;

FIG. 8B illustrates a cross-sectional view of the embodiment of FIG. 8A taken along line VIII-VIII;

FIG. 8C illustrates a top perspective view of the embodiment of FIG. 8A;

FIG. 8D illustrates a top perspective cross-sectional view of the embodiment of FIG. 8A taken along line VIII-VIII;

FIG. 9A illustrates a plan view of another embodiment of a control plate with flow-through passages for a high-conductance valve;

FIG. 9B illustrates a cross-sectional view of the control plate of FIG. 9A taken along line IX-IX;

FIG. 9C illustrates a top perspective view of the control plate of FIG. 9A;

FIG. 9D illustrates a top perspective cross-sectional view of the control plate of FIG. 9A taken along line IX-IX;

FIG. 10A illustrates a plan view of another representative high-conductance valve body having two nested groups of concentric orifice ridges;

FIG. 10B illustrates a cross-sectional view of the high-conductance valve body of FIG. 10A taken along line X-X;

FIG. 10C illustrates a top perspective view of the high-conductance valve body of FIG. 10A;

FIG. 10D illustrates a top perspective cross-sectional view of the high-conductance valve body of FIG. 10A taken along line X-X;

FIG. 11A illustrates a plan view of a control plate with flow-through passages in accordance with FIGS. 9A-9D combined with a valve topworks installed atop a high-conductance valve body having nested groups of concentric orifice ridges in accordance with FIGS. 10A-10D;

FIG. 11B illustrates a cross-sectional view of the embodiment of FIG. 11A taken along line XI-XI;

FIG. 11C illustrates a top perspective view of the embodiment of FIG. 11A; and

FIG. 11D illustrates a top perspective cross-sectional view of the embodiment of FIG. 11A taken along line XI-XI.

DETAILED DESCRIPTION

Figure 1A:
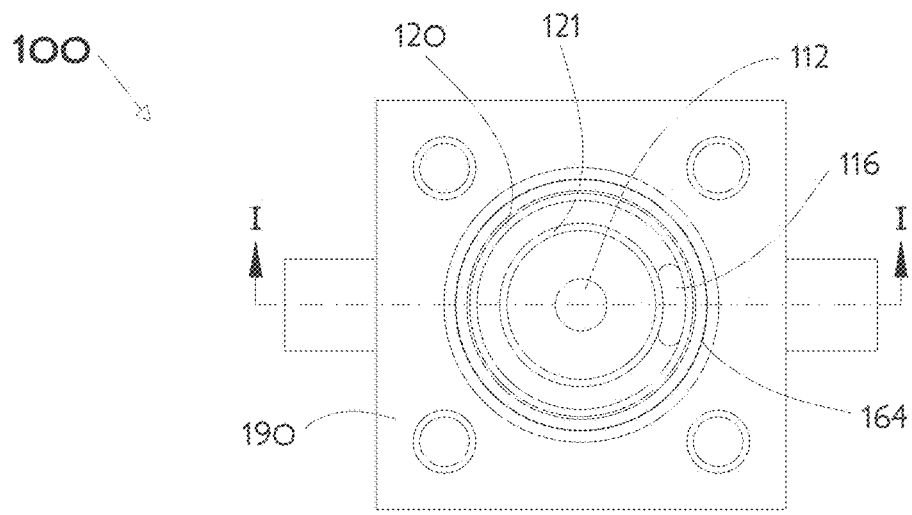
FIG. 1A illustrates a plan view of a representative high-conductance valve body having centered concentric orifice ridges.

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting.

Figure 1B:
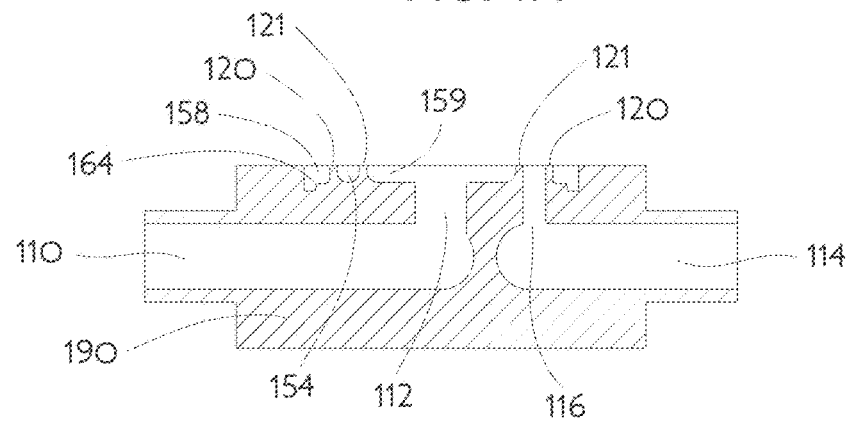
FIG. 1B illustrates a cross-sectional view of the high-conductance valve body of FIG. 1A taken along line I-I.
Figure 1D:
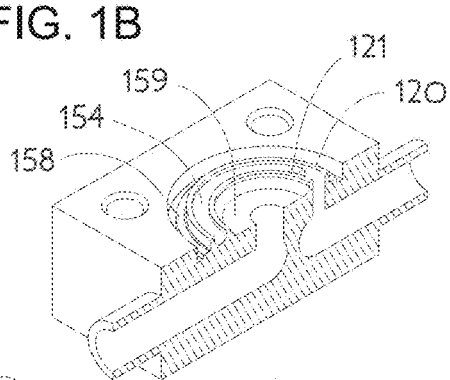
FIG. 1D illustrates a top perspective cross-sectional view of the high-conductance valve body of FIG. 1A taken along line I-I.
Figure 1C:
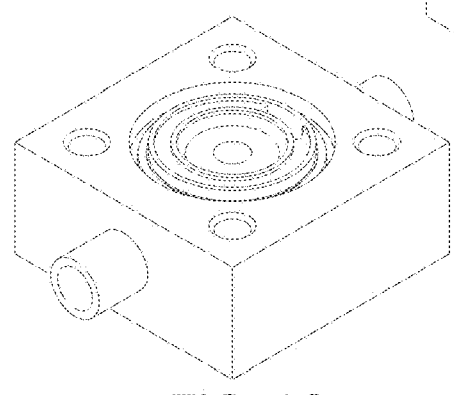
FIG. 1C illustrates a top perspective view of the high-conductance valve body of FIG. 1A.

A representative example of a high-conductance valve body 190 having centered concentric orifice ridges 120, 121 is illustrated in FIGS. 1A-1D. A more complete exemplary valve assembly 100 may have a topworks including a valve housing 160 removably joined to the valve body 190 by deforming a metallic gasket 165 as a leak-free assembly further illustrated in FIGS. 4A-4D. The topworks may include an actuator (not shown) chosen for a specific application. For example, a pneumatic actuator might be used for a simple on-off high-conductance valve, but a piezoelectric actuator might be used for a proportional control high-conductance valve adapted to a mass flow controller electronics system. Open cavities 154, 158, 159 formed in an upper surface of the valve body 190 may be considered as lower portions of a valve chamber 150 while an upper portion 157 of the valve chamber is formed in a lower surface of the valve housing 160 thereabove. A large orifice ridge 120 formed as a circular upward projection from the valve body 190 separates an outer valve chamber portion 158 from an intermediate valve chamber portion 154 which is surrounded by the large orifice ridge 120. A generally concentric small orifice ridge 121 is also formed as a circular upward projection from the valve body 190 surrounded by the large orifice ridge 120 and further separates an inner valve chamber portion 159 from the intermediate valve chamber portion 154. Throughout this disclosure a contiguous volume located between a pair of adjacent orifice ridge segments (e.g., between the large orifice ridge 120 and the small orifice ridge 121) may be referred to as an intermediate valve chamber portion, an adjacent contiguous volume disposed outside the pair (or pairs) of adjacent orifice ridge segments may be referred to as an outer valve chamber portion (e.g., 158), and an adjacent contiguous volume disposed inside the pair (or pairs) of adjacent orifice ridge segments may be referred to as an inner valve chamber portion (e.g., 159) for purposes of identification only and is not indicative of the direction of fluid flow. A gasket sealing region 164 may be formed in the upper surface of the valve body 190 to receive the metallic gasket 165 adjacent the periphery of the outer valve chamber portion 158.

The exemplary valve 100 may further comprise a first fluid conduit 110 (typically an inlet) and a second fluid conduit 114 (typically an outlet), both which conduits communicate fluid to the valve chamber 150, a valve chamber sealing diaphragm 170, and a control element moveable by deflection of the valve chamber sealing diaphragm 170. The moveable control element may be comprised of a control plate 200 (further described below) affixed to a control shaft 182 that is affixed to the diaphragm 170. In the design of the exemplary valve 100, a first fluid conduit aperture 112 provides fluid communication between the inner valve chamber portion 159 and the first fluid conduit 110. Similarly, a second fluid conduit aperture 116 provides fluid communication between the intermediate valve chamber portion 154 and the second fluid conduit 114. In the present illustrations of FIGS. 4A-4D, the valve 100 is completely closed in a shut-off no-flow condition so the control plate 200 is shown contacting both the large orifice ridge 120 and the small orifice ridge 121. Designers will appreciate the first fluid conduit 110 and second fluid conduit 114 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 190 may be used with a Hastelloy® nickel alloy control plate 200 and an Elgiloy® cobalt alloy sealing diaphragm 170.

An example of a flow-through control plate 200 illustrated in FIGS. 2A-2D comprises a control plate body 240 formed as a basically circular disk having one or more features on the opposed sides of the disk. Those features may include a central thru-hole 242, a counterbore 244, and one or more top holes 246. The counterbore 244 would typically be centered and usually be formed in a flat disk side intended to face the orifice ridges 120,121. The one or more top holes 246 may pierce the control plate body 240 from the opposite disk side and thereby leave one or more webs 248 between the central thru-hole 242 and the control plate body 240. Alternatively, the top holes 246 may be placed to intersect the counterbore 244 while also leaving one or more webs 248 between the central thru-hole 242 and the rest of the control plate body 240. The webs 248 bridge over the counterbore 244. In either case the top holes 246 constitute fluid passageways through which fluid may pass from one side of the control plate body 240 to the opposite side without need to transit around the outside diameter periphery. As illustrated in FIGS. 4A-4D, the control plate 200 may be mounted onto a stub of the control shaft 182 and thereby suspended within the valve chamber 150. Any suitable mounting method may be used such as press fit (see, for example, FIGS. 9A-9D), swaging the head of the stub, a threaded fastener, welding, or similar design choices according to the desires of a practitioner, so long as the fluid passageways through the top holes 246 are not obscured. It should be appreciated that, rather than the control plate being mounted to the stub of the control shaft 182 using a thru-hole 242 as shown in FIGS. 2A-2D, a blind hole mounting may instead be used as depicted in FIGS. 9A-9D.

The manner of controlling fluid flow may be further understood by considering the inner valve chamber portion 159 surrounded by the small orifice ridge 121, being connected by the first fluid conduit aperture 112 in fluid communication with the first fluid conduit 110, whereby at least a portion of the control plate 200 may be moved toward or away from the small orifice ridge 121 to create a first control gap (not shown) through which a first fluid portion may controllably flow. The controllable first fluid portion may transit directly to the intermediate valve chamber portion 154 through the first control gap from the inner valve chamber portion 159 from whence it may exit through an offset second fluid conduit aperture 116 in fluid communication with the second fluid conduit 114. In the present example valve 100, an actuator (not shown) may apply a force to the control shaft 182 to deflect the diaphragm 170 and thereby modulate the conductance through the valve 100 by changing the first control gap.

Simultaneous with the preceding described flow of the first fluid portion, moving at least a portion of the control plate 200 toward or away from the large orifice ridge 120 similarly creates a second control gap (not shown) through which a second fluid portion may controllably flow. The controllable second fluid portion may transit from the inner valve chamber portion 159 through the top holes 246 of the control plate 200 and sweep through the upper valve chamber portion 157 into the outer valve chamber portion 158 from whence the second fluid portion may exit through the second control gap into the intermediate valve chamber portion 154. Upon reaching the intermediate valve chamber portion 154, the controllable second fluid portion also may exit through the offset second fluid conduit aperture 116 in fluid communication with the second fluid conduit 114. Thus in the present example valve 100, the actuator (not shown) applying a force to the control shaft 182 and deflecting the diaphragm 170 thereby additionally modulates the conductance through the valve 100 by changing the second control gap. It should be appreciated that while the valve 100 is closed, fluid may pass through the holes in the control plate 200, but cannot go further. When the valve 100 is closed, fluid cannot pass from the first fluid conduit 110 to the second fluid conduit 114.

Designers may appreciate the large 120 and small 121 orifice ridges need merely be nested rather than exactly concentric; moreover, the nested pair of orifice ridges 120, 121 may be placed asymmetrically with respect to the shape and dimensions of the internal valve chamber 150. The flow-through control plate 200 of course needs to have a continuous uninterrupted surface region, on the lower flat side of the disk shaped body 240, sufficient to span between contacting the large 120 and small 121 orifice ridges and cover the entire intermediate valve chamber portion 154. A single orifice ridge of non-circular shape (not shown) may also have adjacent segments enclosing an intermediate valve chamber portion that a flow-through control plate can entirely cover. Designers will also appreciate the described directions of fluid flow, progressing from the first fluid conduit 110 to the second fluid conduit 114, are used for convenience and clarity but are not limiting. Fluid may flow in an opposite direction, from the second fluid conduit 114 to the first fluid conduit 110, and the complete valve chamber 150 will still be beneficially swept by the controllable fluid flow. The valve design illustrated in FIGS. 4A-4D substantially eliminates any concerns about internal dead space versus swept volumes and may also improve dynamic response of the exemplary valve design. The flow-through control plate enables the use of nested orifice ridges 120, 121 that together create total control gap length nearly double the circumference of a single large orifice while substantially reducing the area which must be closed to achieve shut-off. This combination provides high-conductance with low closing force. It should be appreciated that in a diaphragm sealed valve of the type illustrated in FIGS. 4A-4D, the amount of axial displacement (e.g., upward and downward in the cross-sectional view of FIG. 4B) of the control plate 200 is quite limited (e.g., about 50 μm for a piezoelectric actuated valve and about 200 μm for a solenoid actuated valve). The use of nested orifice ridges thus permits higher conductance that is nearly double that which could be achieved with only a single orifice ridge.

Figure 3A:
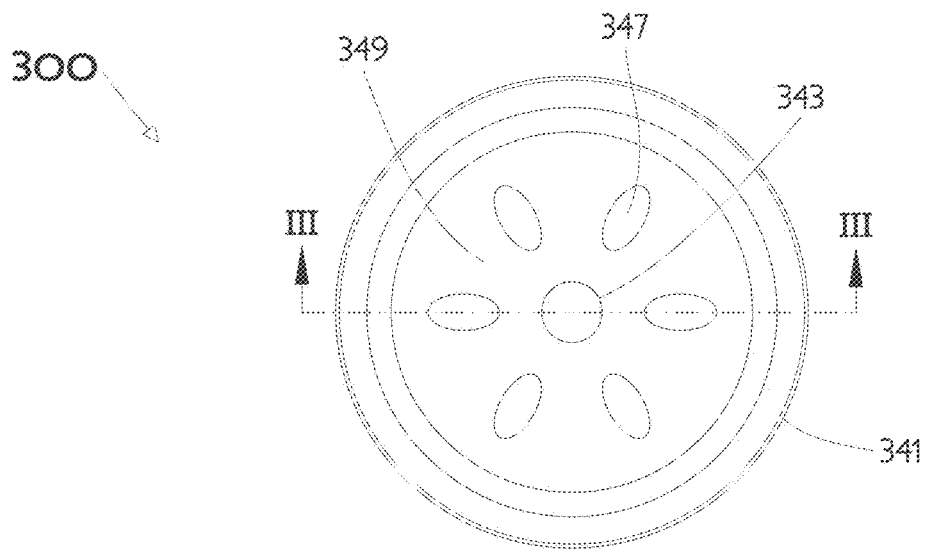
FIG. 3A illustrates a plan view of another embodiment of a control plate with flow-through passages for a high-conductance valve.
Figure 3B:
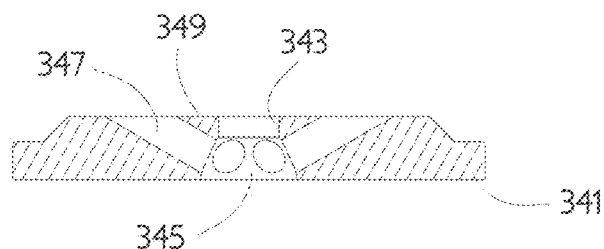
FIG. 3B illustrates a cross-sectional view of the control plate of FIG. 3A taken along line III-III.
Figure 3C:
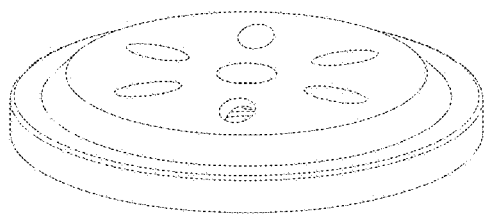
FIG. 3C illustrates a top perspective view of the control plate of FIG. 3A.
Figure 3D:
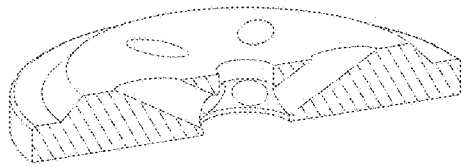
FIG. 3D illustrates a top perspective cross-sectional view of the control plate of FIG. 3A taken along line III-III.

Another example of a flow-through control plate 300 is illustrated in FIGS. 3A-3D and comprises a control plate body 341 formed as a basically circular disk having one or more features on the opposed sides of the disk. Those features may include a central thru-hole 343, a spherical pocket (or recess) 345, and one or more angled top holes 347. The spherical pocket 345 would typically be centered and usually be formed in a flat disk side intended to face the orifice ridges 120, 121. The one or more angled top holes 347 may pierce the control plate body 341 from the spherical pocket 345 to the opposite disk side and thereby leave one or more webs 349 between the central thru-hole 343 and the rest of the control plate body 341. The webs 349 bridge over the spherical pocket 345. The spherical pocket 345 is useful when drilling the angled top holes 347 because entry of those angled holes may be locally perpendicular to the pocket surface thereby minimizing drill wobble or bending. It should be appreciated that rather than a spherical pocket or recess 345, a suitable angled conical pocket or recess could alternatively be used to aid in drilling the angled top holes 347. The angled top holes 347 constitute fluid passageways through which fluid may pass from one side of the control plate body 341 to the opposite side without need to transit around the outside diameter periphery. As illustrated in FIGS. 5A-5D, the control plate 300 may be mounted onto a stub of the control shaft 182 and thereby suspended within the valve chamber 150. Any suitable mounting method may be used such as press fit (see, for example, FIGS. 9A-9D), swaging the stub head, a threaded fastener, welding, or similar design choices according to the desires of a practitioner, so long as the fluid passageways through the angled top holes 347 are not obscured. It should be appreciated that, rather than the control plate being mounted to the stub of the control shaft 182 using a thru-hole 343 as shown in FIGS. 3A-3D, a blind hole mounting may instead be used as depicted in FIGS. 9A-9D.

The manner of controlling fluid flow for the valve assembly illustrated in FIGS. 5A-5D, using the exemplary flow-through control plate 300, may be further understood as essentially identical to that described for the valve assembly illustrated in FIGS. 4A-4D using the earlier mentioned exemplary flow-through control plate 200. A controllable first fluid portion may transit directly to the intermediate valve chamber portion 154 through a first control gap (not shown) from the inner valve chamber portion 159 from whence it may exit through an offset second fluid conduit aperture 116 in fluid communication with the second fluid conduit 114. Particular to the flow-through control plate design 300, a controllable second fluid portion may transit from the inner valve chamber portion 159 through the angled top holes 347 of the control plate 300 to sweep through the upper valve chamber portion 157 into the outer valve chamber portion 158, from whence the second fluid portion may exit through the second control gap into the intermediate valve chamber portion 154. The flow-through control plate 300 also needs to have a continuous uninterrupted surface region, on the lower flat side of the disk shaped body 341, sufficient to span between contacting the large 120 and small 121 orifice ridges and cover the entire intermediate valve chamber portion 154. Designers will also appreciate the described directions of fluid flow are used for convenience and clarity but are not limiting in the exemplary valve assembly illustrated in FIGS. 5A-5D. Fluid may flow in an opposite direction and the complete valve chamber 150 will still be beneficially swept by the controllable fluid flow. The valve assembly design illustrated in FIGS. 5A-5D substantially eliminates any concerns about internal dead space versus swept volumes and may also improve dynamic response of the exemplary valve design. The flow-through control plate enables the use of nested orifice ridges 120,121 that together create total control gap length nearly double the circumference of a single large orifice while substantially reducing the area which must be closed to achieve shut-off. This combination provides high-conductance with low closing force.

Figure 6A:
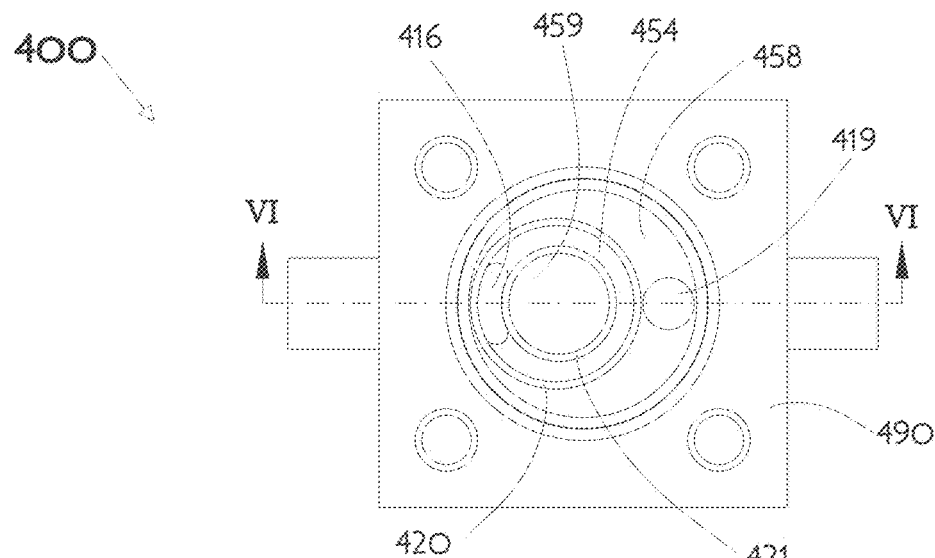
FIG. 6A illustrates a plan view of another representative high-conductance valve body having offset concentric orifice ridges.
Figure 6B:
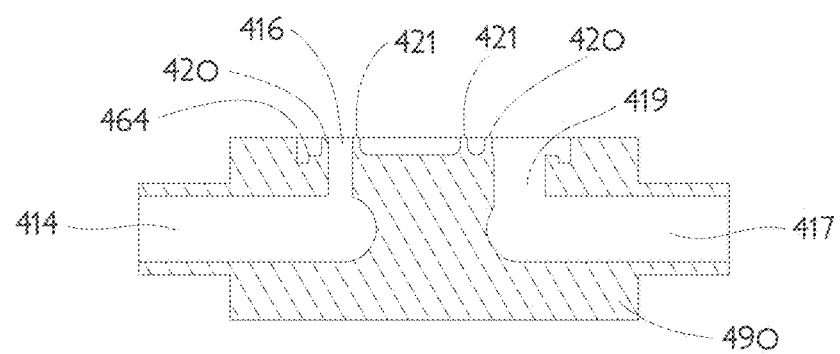
FIG. 6B illustrates a cross-sectional view of the high-conductance valve body of FIG. 6A taken along line VI-VI.
Figure 6C:
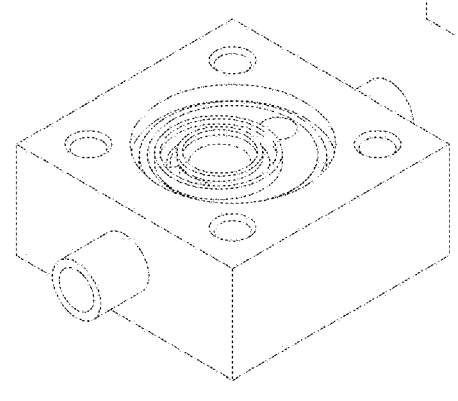
FIG. 6C illustrates a top perspective view of the high-conductance valve body of FIG. 6A.
Figure 6D:
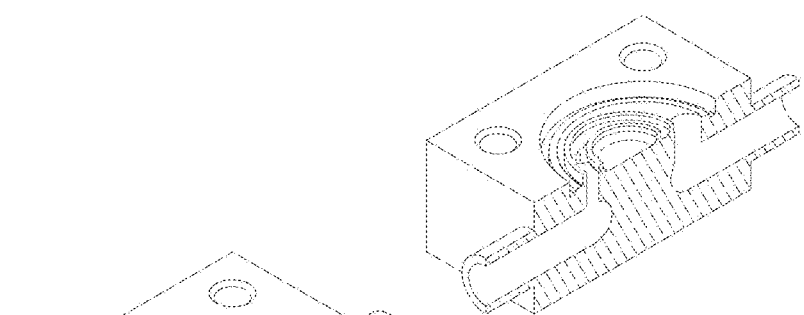
FIG. 6D illustrates a top perspective cross-sectional view of the high-conductance valve body of FIG. 6A taken along line VI-VI.

A representative example of another high-conductance valve body 490 having nested orifice ridges 420, 421 is illustrated in FIGS. 6A-6D. A more complete exemplary valve assembly 400 may have a topworks including a valve housing 460 removably joined to the valve body 490 by deforming a metallic gasket 465 as a leak-free assembly further illustrated in FIGS. 8A-8D. The topworks may include an actuator (not shown) chosen for a specific application. For example, a pneumatic actuator might be used for a simple on-off high-conductance valve, but a piezoelectric actuator might be used for a proportional control high-conductance valve adapted to a mass flow controller electronics system. Open cavities 454, 458, 459 formed in an upper surface of the valve body 490 may be considered as lower portions of a valve chamber while an upper portion 457 of the valve chamber is formed in a lower surface of the valve housing 460 thereabove. A large orifice ridge 420 formed as a generally circular upward projection offset within the valve body 490 separates an outer valve chamber portion 458 from an intermediate valve chamber portion 454 which the large orifice ridge 420 surrounds. A nested small orifice ridge 421 also formed as a circular upward projection from the valve body 490 further separates an inner valve chamber portion 459 from the intermediate valve chamber portion 454 which surrounds it. A gasket sealing region 464 may be formed in the upper surface of the valve body 490 to receive the metallic gasket 465 adjacent the periphery of the outer valve chamber portion 458.

The exemplary valve 400 may further comprise a first fluid conduit 417 (typically an inlet) and a second fluid conduit 414 (typically an outlet), both which conduits communicate fluid to the valve chamber, a valve chamber sealing diaphragm 470, and a control element moveable by deflection of the valve chamber sealing diaphragm 470. The control element may be comprised of a control plate 600 (further described below) including a valve stroke amplifier mechanism affixed to a control shaft 482 that is affixed to the diaphragm 470. In the design of the exemplary valve 400, a first fluid conduit aperture 419 provides fluid communication between the outer valve chamber portion 458 and the first fluid conduit 417. Similarly, a second fluid conduit aperture 416 provides fluid communication between the intermediate valve chamber portion 454 and the second fluid conduit 414. In the present illustrations of FIGS. 8A-8D the valve assembly 400 is completely closed in a shut-off no-flow condition so the control plate 600 is shown contacting both the large orifice ridge 420 and the small orifice ridge 421. Designers will appreciate the first fluid conduit 417 and the second fluid conduit 414 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 490 may be used with a Hastelloy® nickel alloy control plate 600 and an Elgiloy® cobalt alloy sealing diaphragm 470.

Figure 7A:
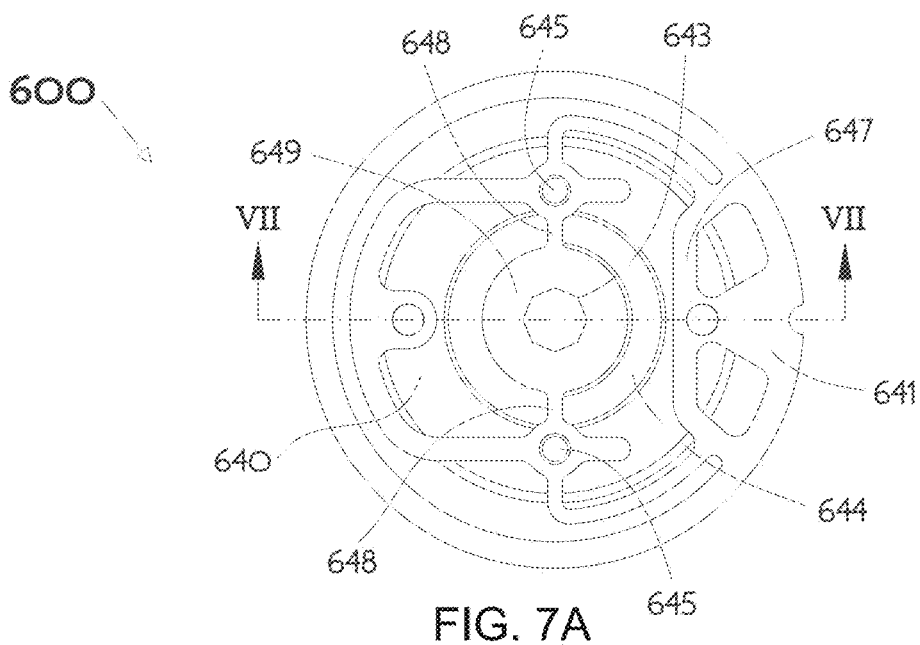
FIG. 7A illustrates an embodiment of a control plate with flow-through passages combined with a valve stroke amplifier disc.
Figure 7B:
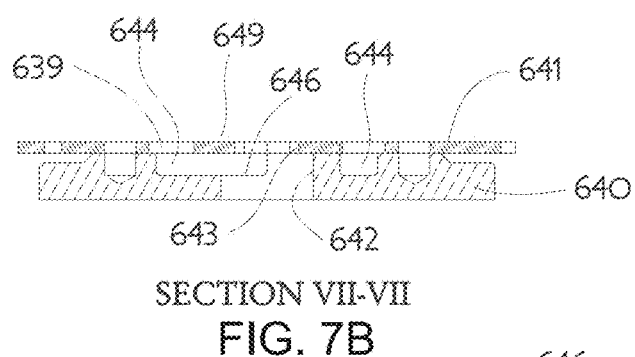
FIG. 7B illustrates a cross-sectional view of the control plate and valve stroke amplifier disc of FIG. 7A taken along line VII-VII.
Figure 7D:
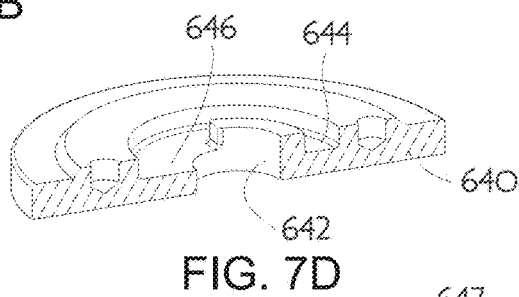
FIG. 7D illustrates a top perspective cross-sectional view of the control plate of the combined control plate and valve stroke amplifier disc of FIG. 7A taken along line VII-VII.
Figure 7C:
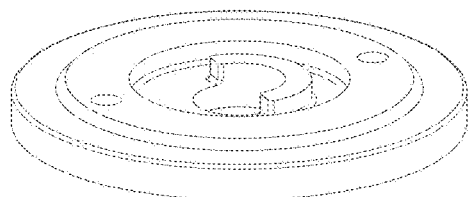
FIG. 7C illustrates a top perspective view of the control plate of the combined control plate and valve stroke amplifier disc of FIG. 7A.
Figure 7F:
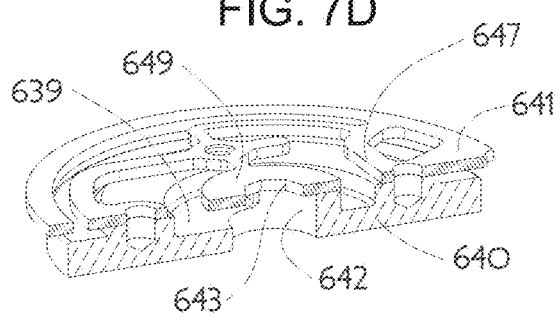
FIG. 7F illustrates a top perspective cross-sectional view of the combined control plate and valve stroke amplifier disc of FIG. 7A taken along line VII-VII.
Figure 7E:
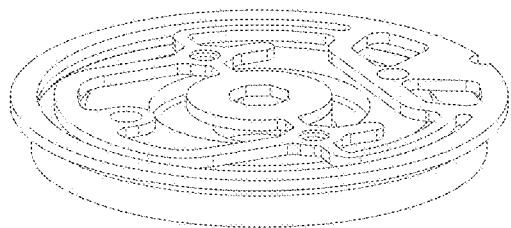
FIG. 7E illustrates a top perspective view of the combined control plate and valve stroke amplifier disc of FIG. 7A.

Another example of a flow-through control plate 600 illustrated in FIGS. 7A-7F, and included in FIGS. 8A-8D, comprises a control plate body 640 and a Valve Stroke Amplification Mechanism amplifier disc 641 as described in U.S. patent application Ser. No. 14/932,086 filed by the present inventor Kim Ngoc Vu on Nov. 4, 2015. As illustrated in FIGS. 7A-7F the control plate body 640 is formed as a basically circular disk with features which include a central thru-hole 642, a ring-shaped groove 644, and a top relief 646. The ring-shaped groove 644 and top relief 646 are formed in the disk side opposite the flat side intended to face one or more orifice ridges. The top relief 646 is placed to intersect the ring-shaped groove 644 and a portion of the central thru-hole 642 thereby providing an open fluid passageway through which fluid may pass from one side of the control plate body 640 to the opposite side without need to transit around its outside diameter periphery. The amplifier disc 641 is described in detail within the cited U.S. patent application Ser. No. 14/932,086. Amplifier disc features of interest for the instant application include a lifting hole 643, a passive segment, an active segment 649, a void passageway 639 adjacent the active segment, attachment points 645, and torsion bars 648. The control plate body 640 and amplifier disc 641 are attached to each other by welding at the two attachment points 645 whereby the torsion bars 648 and active segment 649 constitute a web that bridges over a portion of the top relief 646 and ring-shaped groove 644. A portion of the void passageway 639 is directly next to the top relief 646 thereby providing a fluid pathway through which fluid may pass from one side of the control plate 600 to the opposite side without need to transit around the outside diameter periphery of the assembly. As illustrated in FIGS. 8A-8D, the control plate 600 may be mounted onto a stub of the control shaft 482 using the stroke amplifier disc lifting hole 643 and thereby suspended within the valve chamber. Any suitable mounting method may be used such as press fit, swaging the stub head, a threaded fastener, welding, or similar design choices according to the desires of a practitioner, so long as the fluid passageway through the top relief 646 and amplifier disc void passageway 639 is not obscured.

A force from a topworks actuator (not shown) applied at the amplifier disc lifting hole 643 in the active segment 649 will be communicated to the attachment points 645 by the torsion bars 648. When such applied force is a lifting instance, the passive segment 647 will hold downward an off center first portion of the flow-through control plate body 640 while a diametrically opposite second portion is lifted upward by the diametrical force imparted at the attachment points 645. The resulting motion will open a wedge-like gap between the control plate planar bottom surface and both the large 420 and small 421 orifice ridges in the exemplary valve 400 illustrated in FIGS. 8A-8D. When the valve 400 is in a closed condition (as shown in FIGS. 8A-8D) the various amplifier disc elements are nominally coplanar and the flow-through control plate body 640 contacts the large 420 and small 421 orifice ridges.

The manner of controlling fluid flow may be further understood by considering the outer valve chamber portion 458 fed by the first fluid conduit aperture 419 in fluid communication with the first fluid conduit 417, whereby at least a portion of the control plate 600 may be moved toward or away from the large orifice ridge 420 to create a wedge-like first control gap (not shown) through which a first fluid portion may controllably flow. The controllable first fluid portion may transit directly from the outer valve chamber portion 458 through the first control gap into the intermediate valve chamber portion 454 from whence it may exit through the second fluid conduit aperture 416 in fluid communication with the second fluid conduit 414. In the present example valve 400, an actuator (not shown) may apply a force to the control shaft 482 to deflect the diaphragm 470 and thereby modulate the conductance through the valve 400 by changing the first control gap. It should be appreciated that while the valve 400 is closed, fluid may pass from the first fluid conduit 417, through the first fluid conduit aperture 419, around an outer periphery of the control plate 600, into the outer valve chamber portion 458 and the upper portion 457 of the valve chamber and through the holes in the control plate 600 to the inner valve chamber portion 459, but cannot go further. Thus, when the valve 400 is closed, fluid cannot pass from the first fluid conduit 417 to the second fluid conduit 414.

Simultaneous with the preceding described flow of the first fluid portion, moving at least a portion of the control plate 600 toward or away from the small orifice ridge 421 similarly creates a wedge-like second control gap (not shown) through which a second fluid portion may controllably flow. The controllable second fluid portion may transit from the outer valve chamber portion 458 sweeping through the upper valve chamber portion 457 and then through the control plate 600, via the amplifier disc void passageway 639 and the top relief 646 of the control plate body 640, into the inner valve chamber portion 459, and then the controllable second fluid portion may transit from the inner valve chamber portion 459 through the second control gap into the intermediate valve chamber portion 454 from whence the second fluid portion may exit through the second conduit aperture 416 in fluid communication with the second fluid conduit 414. Thus in the present example valve 400, the actuator (not shown) applying a force to the control shaft 482 and deflecting the diaphragm 470 thereby additionally modulates the conductance through the valve 400 by changing the second control gap. Designers will also appreciate the described directions of fluid flow are used for convenience and clarity but are not limiting in the exemplary valve assembly illustrated in FIGS. 8A-8D. Fluid may flow in an opposite direction and the complete valve chamber 450 will still be beneficially swept by the controllable fluid flow. The valve design illustrated in FIGS. 8A-8D substantially eliminates any concerns about internal dead space versus swept volumes and may also improve dynamic response of the exemplary valve design. The flow-through control plate enables the use of nested orifice ridges 420,421 that together create total control gap length nearly double the circumference of a single large orifice while substantially reducing the area which must be closed to achieve shut-off. This combination provides high-conductance with low closing force.

A representative example of another high-conductance valve body 890 having two nested groups of centered concentric orifice ridges 820, 821, 822, 823 is illustrated in FIGS. 10A-10D. A more complete exemplary valve assembly 1000 may have a topworks including a valve housing 860 removably joined to the valve body 890 by deforming a metallic gasket 865 as a leak-free assembly further illustrated in FIGS. 11A-11D. The topworks may include an actuator (not shown) chosen for a specific application. For example, a manual actuator might be used for a simple on-off high-conductance valve, but a piezoelectric or solenoid actuator might be used for a proportional control high-conductance valve adapted to a mass flow controller electronics system. Open cavities 852, 854, 856, 858, 859 formed in an upper surface of the valve body 890 may be considered as lower portions of a valve chamber while an upper portion 857 of the valve chamber is formed in a lower surface of the valve housing 860 thereabove. A largest orifice ridge 820 formed as a circular upward projection from the valve body 890 separates an outer valve chamber portion 858 from a first intermediate valve chamber portion 856 which is surrounded by the largest orifice ridge 820. A generally concentric first smaller orifice ridge 821 is also formed as a circular upward projection from the valve body 890 surrounded by the largest orifice ridge 820 and further separates an enclosed second intermediate valve chamber portion 854 from the first intermediate valve chamber portion 856. A generally concentric second smaller orifice ridge 822 is also formed as a circular upward projection from the valve body 890 surrounded by the first smaller orifice ridge 821 and further separates an enclosed third intermediate valve chamber portion 852 from the second intermediate valve chamber portion 854. A generally concentric smallest orifice ridge 823 is also formed as a circular upward projection from the valve body 890 surrounded by the second smaller orifice ridge 822 and further separates an inner valve chamber portion 859 from the third intermediate valve chamber portion 852. A gasket sealing region 864 may be formed in the upper surface of the valve body 890 to receive the metallic gasket 865 adjacent the periphery of the outer valve chamber portion 858.

The exemplary valve 1000 may further comprise a first fluid conduit 810 (typically an inlet) and a second fluid conduit 814 (typically an outlet), both which conduits communicate fluid to the valve chamber, a valve chamber sealing diaphragm 870, and a control element moveable by deflection of the valve chamber sealing diaphragm 870. The moveable control element may be additionally comprised of a control plate 900 (further described below) affixed to a control shaft 882 that is affixed to the diaphragm 870. In the design of the exemplary valve 1000, a first fluid conduit aperture 812 provides fluid communication between the inner valve chamber portion 859 and the first fluid conduit 810. Similarly, one or more second fluid conduit apertures 816 provide fluid communication between the first intermediate valve chamber portion 856 and the second fluid conduit 814. Also provided are one or more third inner fluid conduit apertures 818 which provide fluid communication between the third intermediate valve chamber portion 852 and the second fluid conduit 814. In the present illustration of FIGS. 11A-11D, the valve 1000 is completely closed in a shut-off no-flow condition so the control plate 900 is shown contacting all four orifice ridges: largest 820, first smaller 821, second smaller 822, and smallest 823. Designers will appreciate the first fluid conduit 810 and second fluid conduit 814 may provide fluid passage to a surface mount component interface rather than the tube stubs illustrated. The K1S and W-Seal are surface mount component interface examples well known in semiconductor capital equipment design and therefore not illustrated in the drawings of this disclosure. The parts comprising said valve may be constructed from materials chosen for desired chemical inertness relative to the fluids to be handled and may include, for example, stainless steels, Monel® metals, titanium alloys, Hastelloy® alloys, Elgiloy®, brass, or polymers such as Teflon®, Kel-F®, Vespel®, Kynar®, and combinations of metals and polymers either separate or together. For example, a type 316L stainless steel valve body 890 may be used with a Hastelloy® nickel alloy control plate 900 and an Elgiloy® cobalt alloy sealing diaphragm 870. Alternatively, the valve body, sealing diaphragm, and control plate body, may all be made from the same stainless steel alloy.

An example of a flow-through control plate 900 illustrated in FIGS. 9A-9D comprises a control plate body 940 formed as a basically circular disk having one or more features on the opposed sides of the disk. Those features may include a central mounting hole 942 (blind or through), one or more first middle thru-holes 944, and one or more second middle thru-holes 946. As illustrated in FIGS. 11A-11D, the control plate 900 may be mounted onto a stub of the control shaft 882 and thereby suspended within the valve chamber. Any suitable mounting method may be used such as press fit, swaging the head of the stub, a threaded fastener, welding, or similar design choices according to the desires of a practitioner, so long as the fluid passageways formed by the first middle 944 and second middle 946 thru-holes are not obscured. It should be appreciated that, rather than the control plate 900 being mounted to the stub of the control shaft 882 using a blind hole as shown in FIGS. 9A-9D, a thru-hole mounting may instead be used as depicted in FIGS. 2A-2D, 3A-3D, and 7A-7F.

The one or more first middle thru-holes 944 pierce the control plate body 940 and typically are uniformly spaced around a constant diameter first circle surrounding the central mounting hole 942. The diameter of the first circle and diameter of the first middle thru-holes 944 are chosen so those thru-holes only cover the inner valve chamber portion 859 and do not overlap the adjacent smallest orifice ridge 823. Angle drilling the first middle thru-holes 944, as illustrated in FIGS. 9A-9D and FIGS. 11A-11D, allows use of larger diameter holes while not overlapping the smallest orifice ridge 823. It should be appreciated that although not shown, a spherical pocket or recess may be used to aid in drilling of the first middle thru-holes 944 in the manner discussed previously with respect to FIGS. 3A-3D. The first middle thru-holes 944 constitute fluid passageways through which fluid may pass from one side of the control plate body 940 to the opposite side without need to transit around the outside diameter periphery. More particularly, the first middle thru-holes 944 fluidly connect the inner valve chamber portion 859 with the upper valve chamber portion 857. Webs of material 945 between the one or more adjacent first middle thru-holes 944 provide mechanical connection from the central mounting hole 942 to a continuous uninterrupted first surface region 941, on the lower flat side of the disk shaped body 940, that first surface region 941 having radial extent sufficient to span between contacting the second smaller orifice ridge 822 and the smallest orifice ridge 823 while covering the entire third intermediate valve chamber portion 852.

The one or more second middle thru-holes 946 pierce the control plate body 940 and typically are uniformly spaced around a constant diameter second circle further surrounding the first surface region 941 and first middle thru-holes 944. The diameter of the second circle and diameter of the second middle thru-holes 946 are chosen so those thru-holes only cover the second intermediate valve chamber portion 854 and do not overlap the adjacent first smaller orifice ridge 821 nor the second smaller orifice ridge 822. The second middle thru-holes 946 constitute fluid passageways through which fluid may pass from one side of the control plate body 940 to the opposite side without need to transit around the outside diameter periphery. More particularly, the second middle thru-holes 946 fluidly connect the second intermediate valve chamber portion 854 with the upper valve chamber portion 857. Webs of material 947 between the one or more adjacent middle thru-holes 946 provide mechanical connection from the first surface region 941 to a continuous uninterrupted second surface region 943, on the lower flat side of the disk shaped body 940, that second surface region 943 having radial extent sufficient to span between contacting the largest orifice ridge 820 and first smaller orifice ridge 821 while covering the entire first intermediate valve chamber portion 856.

The manner of controlling fluid flow may be further understood by considering the inner valve chamber portion 859 surrounded by the smallest orifice ridge 823, being fed by the first fluid conduit aperture 812 in fluid communication with the first fluid conduit 810, whereby at least a portion of the control plate 900 may be moved toward or away from the smallest orifice ridge 823 to create a first control gap (not shown) through which a first fluid portion may controllably flow. The controllable first fluid portion may transit directly into the third intermediate valve chamber portion 852 from whence it may exit through one or more third fluid conduit apertures 818 in fluid communication with the second fluid conduit 814. A second fluid portion may transit from the inner valve chamber portion 859 upward through the one or more first middle thru-holes 944 into the upper portion 857 of the valve chamber, and therefrom transit downward through the one or more second middle thru-holes 946 into the second intermediate valve chamber portion 854. Moving at least a portion of the control plate 900 toward or away from the second smaller orifice ridge 822 will create a second control gap (not shown) through which the second fluid portion may also controllably flow directly into the third intermediate valve chamber portion 852 from the second intermediate valve chamber portion 854 and then exit through one or more third fluid conduit apertures 818 in fluid communication with the second fluid conduit 814. In the present example valve 1000, an actuator (not shown) may apply a force to the control shaft 882 to deflect the diaphragm 870 and thereby modulate the conductance through the valve 1000 by changing the first control gap and the second control gap.

Simultaneous with the preceding described flow of the first fluid portion and second fluid portion, moving at least a portion of the control plate 900 toward or away from the largest orifice ridge 820 similarly creates a third control gap (not shown) through which a third fluid portion may controllably flow. The controllable third fluid portion may transit from the inner valve chamber portion 859 upward through the one or more first middle thru-holes 944 of the control plate 900 and sweep through the upper valve chamber portion 857 into the outer valve chamber portion 858 from whence the third fluid portion may exit through the third control gap into the first intermediate valve chamber portion 856. Upon reaching the first intermediate valve chamber portion 856 the controllable third fluid portion may exit through the one or more second fluid conduit apertures 816 in fluid communication with the second fluid conduit 814. A fourth fluid portion may transit from the inner valve chamber portion 859 upward through the one or more first middle thru-holes 944 into the upper portion 857 of the valve chamber, and therefrom transit downward through the one or more second middle thru-holes 946 into the second intermediate valve chamber portion 854. Moving at least a portion of the control plate 900 toward or away from the first smaller orifice ridge 821 will create a fourth control gap (not shown) through which the fourth fluid portion may also controllably flow directly into the first intermediate valve chamber portion 856 from whence it may exit through one or more second inner fluid conduit apertures 816 in fluid communication with the second fluid conduit 814. Thus in the present example valve 1000, the actuator (not shown) applying a force to the control shaft 882 and deflecting the diaphragm 870 thereby additionally modulates the conductance through the valve 1000 by changing the third control gap and the fourth control gap. It should be appreciated that while the valve 1000 is closed, fluid may pass through the holes in the control plate 900 and into the upper portion 857 of the valve chamber, the outer valve chamber portion 858 and the second intermediate valve chamber portion 854, but cannot go further. Thus, when the valve 1000 is closed, fluid cannot pass from the first fluid conduit 810 to the second fluid conduit 814.

Designers may appreciate the largest 820 and first smaller 821 orifice ridges need merely be nested rather than exactly concentric; moreover, the nested pair of orifice ridges 820, 821 may be placed asymmetrically with respect to the shape and dimensions of the internal valve chamber. The flow-through control plate 900 of course primarily needs to have a continuous uninterrupted second surface region 943, on the lower flat side of the disk shaped body 940, sufficient to span between contacting the largest 820 and first smaller 821 orifice ridges and cover the entire first intermediate valve chamber portion 856. In similar fashion the second smaller 822 and smallest 823 orifice ridges need merely be nested rather than exactly concentric; moreover, the nested pair of orifice ridges 822,823 may be placed asymmetrically with respect to the shape and dimensions of the internal valve chamber 850. The flow-through control plate 900 of course primarily needs to have a continuous uninterrupted first surface region 941, on the lower flat side of the disk shaped body 940, sufficient to span between contacting the second smaller 822 and smallest 823 orifice ridges and cover the entire third intermediate valve chamber portion 852. Designers will also appreciate the described directions of fluid flow, progressing from the first fluid conduit 810 to the second fluid conduit 814, are used for convenience and clarity but are not limiting. Fluid may flow in an opposite direction, from the second fluid conduit 814 to the first fluid conduit 810, and the complete valve chamber will still be beneficially swept by the controllable fluid flow. The valve design illustrated in FIGS. 11A-11D substantially eliminates any concerns about internal dead space versus swept volumes and may also improve dynamic response of the exemplary valve design. The flow-through control plate enables the use of nested orifice ridges 820,821,822,823 that together create total control gap length about triple the circumference of a single large orifice while substantially reducing the area which must be closed to achieve shut-off. This combination provides high-conductance with low closing force.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A valve assembly comprising:
    a valve body having a valve chamber defined in the valve body, at least one first fluid conduit aperture formed in the valve body at a base of the valve chamber and in fluid communication therewith, at least one second fluid conduit aperture formed in the valve body at the base of the valve chamber and in fluid communication therewith, and at least one pair of adjacent orifice ridge segments formed integrally with the valve body and extending upwardly from the base of the valve chamber and defining an intermediate valve chamber portion between the at least one pair of adjacent orifice ridge segments, one of the at least one first fluid conduit aperture and the at least one second fluid conduit aperture being a fluid conduit inlet aperture and the other of the at least one first fluid conduit aperture and the at least one second fluid conduit aperture being a fluid conduit outlet aperture; and
    a control plate including a control plate body having a first side and a second side opposed to the first side, the control plate body being movable between a closed position in which a surface region of the first side sealingly contacts the at least one pair of adjacent orifice ridge segments and an open position in which an open gap is present between the surface region and the at least one pair of adjacent orifice ridge segments, the control plate having at least one fluid passageway extending through the control plate body from the first side to the second side within a perimeter of the at least one pair of adjacent orifice ridge segments.

2. The valve assembly of claim 1, wherein the at least one pair of adjacent orifice ridge segments includes two adjacent orifice ridge segments that are substantially circular in shape and further define an outer valve chamber portion disposed outside the two adjacent orifice ridge segments and an inner valve chamber portion disposed inside the two adjacent orifice ridge segments.

3. The valve assembly of claim 2, further comprising a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the inner valve chamber portion, the at least one second fluid conduit aperture is in fluid communication with the intermediate valve chamber portion, and the surface region of the first side of the control plate body sealingly contacts the two adjacent orifice ridge segments to prevent fluid from flowing between the at least one first fluid conduit aperture and the at least one second fluid conduit aperture.

4. The valve assembly of claim 3, wherein when the control plate body is in the closed position, the at least one fluid passageway of the control plate provides fluid communication between the inner valve chamber portion and the outer valve chamber portion.

5. The valve assembly of claim 2, further comprising a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the outer valve chamber portion, the at least one second fluid conduit aperture is in fluid communication with the intermediate valve chamber portion, and the surface region of the first side of the control plate body sealingly contacts the two adjacent orifice ridge segments to prevent fluid from flowing between the at least one first fluid conduit aperture and the at least one second fluid conduit aperture.

6. The valve assembly of claim 5, wherein when the control plate body is in the closed position, the at least one fluid passageway of the control plate provides fluid communication between the outer valve chamber portion and the inner valve chamber portion.

7. The valve assembly of claim 1, wherein the at least one pair of adjacent orifice ridge segments includes four adjacent orifice ridge segments that are substantially circular in shape, the four adjacent orifice ridge segments including a largest orifice ridge segment, a first smaller orifice ridge segment surrounded by the largest orifice ridge segment, a second smaller orifice ridge segment surrounded by the first smaller orifice ridge segment, and a smallest orifice ridge segment surrounded by the second smaller orifice ridge segment, the four adjacent orifice ridge segments defining an outer valve chamber portion disposed outside the four adjacent orifice ridge segments, an inner valve chamber portion disposed inside the four adjacent orifice ridge segments, a first intermediate valve chamber portion disposed between the largest orifice ridge segment and the first smaller orifice ridge segment, a second intermediate valve chamber portion disposed between the first smaller orifice ridge segment and the second smaller orifice ridge segment, and a third intermediate valve chamber portion disposed between the second smaller orifice ridge segment and the smallest orifice ridge segment.

8. The valve assembly of claim 7, further comprising a first fluid conduit in fluid communication with the at least one first fluid conduit aperture and a second fluid conduit in fluid communication with the at least one second fluid conduit aperture, wherein when the control plate body is in the closed position, the at least one first fluid conduit aperture is in fluid communication with the inner valve chamber portion, the at least one second fluid conduit aperture is in fluid communication with the first intermediate valve chamber portion and a first continuous uninterrupted flat portion of the surface region of the first side of the control plate body sealingly contacts the largest orifice ridge segment and the first smaller orifice ridge segment to prevent fluid from flowing between the at least one first fluid conduit aperture and the at least one second fluid conduit aperture.

9. The valve assembly of claim 8, wherein the valve body further includes at least one third fluid conduit aperture in fluid communication with the second fluid conduit, and wherein when the control plate body is in the closed position, the at least one third fluid conduit aperture is in fluid communication with the third intermediate valve chamber portion and a second continuous uninterrupted flat portion of the surface region of the first side of the control plate body sealingly contacts the second smaller orifice ridge segment and the smallest orifice ridge segment to prevent fluid from flowing between the at least one first fluid conduit aperture and the at least one third fluid conduit aperture.

10. The valve assembly of claim 9, wherein the at least one fluid passageway includes a first plurality of angled fluid passageways disposed about a radially inner portion of the control plate body and a second plurality of straight fluid passageways disposed about a radially outer portion of the control plate body and extending substantially straight through the control plate body, the first plurality of angled fluid passageways angling radially inwardly from the second side of the control plate body to the first side.

11. The valve assembly of claim 10, wherein the second continuous uninterrupted flat portion of the surface region of the first side of the control plate body is disposed between the first plurality of angled fluid passageways and the second plurality of straight fluid passageways and the first continuous uninterrupted flat portion of the surface region is disposed radially outward of the first plurality of straight fluid passageways.

12. The valve assembly of claim 11, wherein when the control plate body is in the closed position, the first plurality of angled fluid passageways in the control plate provide fluid communication between the inner valve chamber portion and the outer valve chamber portion, and the first plurality of angled fluid passageways and the second plurality of straight fluid passageways provide fluid communication between the inner valve chamber portion, the outer valve chamber portion, and the second intermediate valve chamber portion.

13. The valve assembly of claim 1, further comprising a valve diaphragm that seals the valve chamber.

14. The valve assembly of claim 13, further comprising a topworks that includes the valve diaphragm,
wherein the topworks is installed atop the valve body.

15. The valve assembly of claim 14, wherein the valve diaphragm is integrally formed with the topworks.

16. The valve assembly of claim 13, wherein the valve body and the valve diaphragm are made of the same material.

17. The valve assembly of claim 13, wherein the valve body, the control plate body, and the valve diaphragm are made of stainless steel alloys.

18. The valve assembly of claim 1, wherein the at least one fluid passageway includes a plurality of angled fluid passageways angling radially inwardly from the second side of the control plate body to the first side, and wherein the control plate further includes one of a central thru-hole and a blind hole each to receive a stub of a control shaft, the central thru-hole extending through a center of the control plate body, the blind hole being formed in the center of the second side of the control plate body.

19. The valve assembly of claim 18, wherein the plurality of angled fluid passageways provide fluid communication between an inner valve chamber portion adjacent the first side and an outer valve chamber portion adjacent the second side and a valve diaphragm when the first side is in sealing engagement with the at least one pair of adjacent orifice ridge segments.

20. The valve assembly of claim 1, wherein the control plate body includes a pocket or recess to enable drilling the at least one fluid passageway, and wherein the at least one fluid passageway includes a plurality of angled fluid passageways that extend from the pocket or recess to the second side of the control plate body.

* * * * *